(12) United States Patent
Minter

(10) Patent No.: US 11,790,303 B2
(45) Date of Patent: Oct. 17, 2023

(54) ANALYZING AGENT DATA AND AUTOMATICALLY DELIVERING ACTIONS

(71) Applicant: AmplifAI, Plano, TX (US)

(72) Inventor: Vishal Sean Minter, Highland Village, TX (US)

(*) Notice: Subject to any disclaimer, the term of this patent is extended or adjusted under 35 U.S.C. 154(b) by 278 days.

(21) Appl. No.: 17/162,469

(22) Filed: Jan. 29, 2021

(65) Prior Publication Data

US 2022/0245557 A1 Aug. 4, 2022

(51) Int. Cl.
| | | |
|---|---|---|
| *G06Q 10/00* | (2023.01) | |
| *G09B 19/00* | (2006.01) | |
| *G06F 16/00* | (2019.01) | |
| *G06N 20/00* | (2019.01) | |
| *G06Q 10/0639* | (2023.01) | |
| *G06Q 10/105* | (2023.01) | |
| *G06F 16/245* | (2019.01) | |
| *G06Q 10/0631* | (2023.01) | |

(52) U.S. Cl.
CPC ..... *G06Q 10/06398* (2013.01); *G06F 16/245* (2019.01); *G06N 20/00* (2019.01); *G06Q 10/06393* (2013.01); *G06Q 10/063112* (2013.01); *G06Q 10/063114* (2013.01); *G06Q 10/105* (2013.01); *G09B 19/003* (2013.01)

(58) Field of Classification Search
CPC .......................................... G06Q 10/00–50/00
USPC .......................................................... 705/7.14
See application file for complete search history.

(56) References Cited

U.S. PATENT DOCUMENTS

| | | | | |
|---|---|---|---|---|
| 2005/0192831 A1* | 9/2005 | Ellison | ............. | G06Q 10/06398 705/345 |
| 2008/0103876 A1* | 5/2008 | Armstrong | ......... | G06Q 30/0202 705/7.31 |
| 2008/0162487 A1* | 7/2008 | Richter | ................... | G06Q 10/00 |
| 2013/0226821 A1* | 8/2013 | Chetwynd | ................ | G09B 7/00 705/328 |
| 2019/0012167 A1* | 1/2019 | Boss | ...................... | G06Q 50/01 |
| 2020/0005667 A1* | 1/2020 | Baker | .................... | G09B 19/00 |
| 2021/0383308 A1* | 12/2021 | Hanna | ............... | G06Q 10/06398 |

\* cited by examiner

*Primary Examiner* — Mustafa Iqbal
(74) *Attorney, Agent, or Firm* — Shiv S. Naimpally; FLAGSHIP PATENTS

(57) ABSTRACT

One or more monitoring servers are connected via a data link or API to a server system. The monitoring servers may operate one or more monitoring services that monitor the agent computing devices and agent displays to collect metrics. The server system processes recommendations and auto-delivering actions based on the monitored data of each employee and a variance against a high performer persona. The actions and recommendations are optimized by machine learning logic to improve the agent's performance in one or more metrics. The server system connects to one or more agent computing devices and/or agent displays to auto-deliver the actions.

20 Claims, 18 Drawing Sheets

1500

| Manager Dashboard | Task Manager | Performance Dashboard | Leaderboard | Evaluate |
|---|---|---|---|---|
| Coaching Comparison | | | Task Manager | |
| Manager | # Coachings | Effectiveness | Task | User |
| Manager 1 | 18 | 60% | Task 1 | Name 1 |
| Manager 2 | 15 | 80% | Task 2 | Name 2 |
| Manager 3 | 13 | 45% | Task 3 | Name 3 |
| Manager 4 | 22 | 68% | Task 4 | Name 4 |
| Manager 5 | 6 | 56% | Task 5 | Name 13 |
| | | | Task 6 | Name 5 |

| Manager Dashboard | Task Manager | | Performance Dashboard | | Leaderboard | Evaluate |
|---|---|---|---|---|---|---|
| From | Task | User | Reason | Agent Overview | | |
| System 2 | Coach | 23 | Reason 1 | | | |
| System 1 | Follow Up | 34 | Reason 2 | | | |
| System 4 | Recognize | 65 | Reason 2 | Metric 1 | | 60% |
| System 1 | Calibrate | 12 | Reason 2 | Metric 2 | | 80% |
| | | | | Metric 3 | | 45% |
| | | | | Metric 4 | | 68% |
| | | | | Metric 5 | | 56% |
| | | | | Metric 6 | | 75% |

Fig. 16

ANALYZING AGENT DATA AND AUTOMATICALLY DELIVERING ACTIONS

BACKGROUND OF THE INVENTION

Field of the Invention

This invention relates generally to computing devices and, more particularly to a system to monitor and process employee data resulting in actions delivered directly to employees or to a person in management.

Description of the Related Art

Corporations gather thousands of metrics in an attempt to differentiate employees. Changing employee performance with respect to a first metric may decrease employee performance with respect to a second metric, despite no apparent connection or influence between them. The optimum balance for various key performance indicators (KPIs) may be essentially unknown despite the gathering of thousands of metrics. Likewise, the actions needed to obtain the optimum balance are difficult to predict on an individual basis, leading to poor management of employees, decrease in customer satisfaction and may cause higher attrition. Furthermore, the outcomes and effectiveness of actions performed by employees to improve performance is rarely evaluated periodically. Therefore, employee data is often misunderstood, resulting in actions that may do little to improve employee performance and may even have the opposite effect.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a computer system may execute one or more software applications that One or more monitoring servers, connected via a data link or API, may deliver monitored data to a server system. The monitoring servers may operate one or more monitoring services that monitor the employee computing devices and employee displays to collect metrics. The server system may generate electronic personas of high performing employees and may process recommendations and auto-deliver actions based on the persona to improve every employee. The actions and recommendations are optimized by machine learning logic to improve the employee's performance in one or more metrics to move the employee closer to the high performing persona. The server system connects to one or more employee computing devices and/or employee displays to auto-deliver the actions.

BRIEF DESCRIPTION OF THE DRAWINGS

A more complete understanding of the present disclosure may be obtained by reference to the following Detailed Description when taken in conjunction with the accompanying drawings. In the figures, the left-most digit(s) of a reference number identifies the figure in which the reference number first appears. The same reference numbers in different figures indicate similar or identical items.

FIG. 15 is a graphical user interface of the computer system according to some embodiments;

FIG. 16 is a graphical user interface of the computer system according to some embodiments;

DETAILED DESCRIPTION

Figure 1:
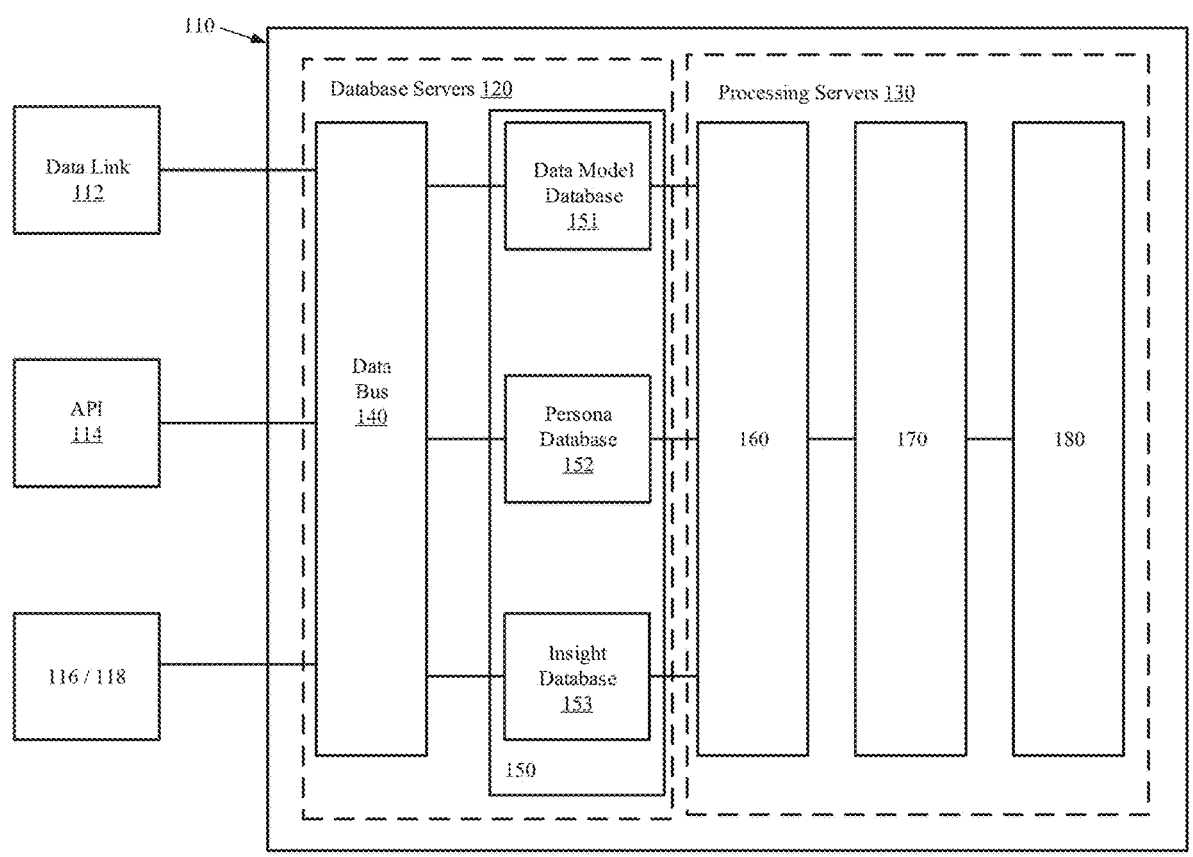
FIG. 1 is a block diagram of a system that includes database servers and processing servers of the computer system according to some embodiments.

The systems and processes described herein enable detection of metrics, actions or both and automatically deliver actions, such as coaching and automated learning, to target result effective variables to change future outcomes. A result effective variable may be characterized as a variable with a causal link to other variables or a variable that precipitates changes in other variables, metrics, or outcomes. These systems and processes may be powered by multiple types of machine learning to identify the result effective variables, generate target metrics, and automate actions to be taken based on a variance of actual metrics from the target metrics. The systems and processes may be adaptive to the needs, goals, and selected machine learning methodology and may be adaptive to employee psychology, employee experience, and customer base.

The computing system of the invention may have a database receiving first data via a data link and storing the first data as well as a server having one or more physical processors, the server being in communication with the database. The physical or hardware processors may be programmed with computer program instructions that when executed by the one or more physical processors cause the server to perform a first data analysis of at least a portion the first data. This analysis generates a first data set. A second data analysis may also be performed that trains one or more machine learning models on the first data set. At least one user device may be connected to the data link generating a second data. The first data analysis performed by the server may generate one or more distributions from the first data and may generate one or more persona models characterizing metrics in an upper percentile of the one or more distributions. The second data analysis performed by the server may execute a machine learning program to train the one or more machine learning models based on the one or more persona models. The one or more machine learning models trained on the server may generate one or more recommendations based on the first data set and the second data or may automatically deliver one or more actions to the at least one user device.

The computing system may train one or more classifiers of the one or more machine learning models to identify and predict performance based on the one or more persona models. The computing system may generate one or more distributions based on the first data from a first period and may generate one or more second distributions based on the second data, the second data being received via the data link in a second period, the first period being different from the second period. The computing system may perform re-training of the one or more machine learning models based on the one or more second distributions, drifts and based on measured outcomes in the second data, the measured outcomes being compared to expected outcomes, the expected outcomes being generated based on the one or more recommendations or the one or more actions.

The one or more of the machine learning models may include two or more machine learning models, and may use a voting classifier to generate a weighted result based on a top ranked subset of results from the two or more machine learning models including an extra trees classifier, a catboost classifier, an extreme gradient boost classifier, a light gradient boost machine, a gradient boosting classifier, quadratic discriminant analysis logic, linear discriminant analysis logic, a random forest classifier, logistic regression logic, naïve bayes, an ada boost classifier, a K-neighbors classifier, a decision tree classifier, a state vector machine (SVM) with a linear kernel, a ridge classifier, long short term memory logic, natural language processing logic, recurrent neural networks (RNN), convolutional neural networks (CNN), multi-level perceptrons, feedforward neural networks, or a combination thereof.

The computing system may have one or more non-transitory computer-readable storage media storing instructions executable by the one or more processors to perform operations that determine that a performance of a set of employees is to be improved with respect to at least one metric based in part on the data gathered in a first time period. The system may then determine, based on the at least one metric, a type of training to provide to each employee in the set of employees and determine a personality type associated with a particular employee. The system may then select, based on the personality type and based on the type of training, a particular training module and may deliver the particular training module to the particular employee. Training and coaching recommendations may be determined based on machine learning models against variances to high performer personas of employees.

The computing system may have one or more non-transitory computer-readable storage media storing instructions executable by the one or more processors to perform operations that determine, based on monitoring data from the data link, when the particular employee is available and deliver the particular training module to the particular employee when the particular employee is available.

The computing system may have one or more non-transitory computer-readable storage media storing instructions executable by the one or more processors to perform operations that determine that the particular employee has completed the particular training module and gather second data associated with the particular employee in a second time period that is subsequent to the particular employee completing the particular training module. The system may then determine that the particular employee has improved with respect to (1) the at least one metric relative to a previously determined performance of the particular employee, and (2) the at least one metric relative to other peers in a peer group that includes the particular employee.

The computing system may have one or more non-transitory computer-readable storage media storing instructions executable by the one or more processors to perform operations that determine that the particular employee has completed the particular training module and gather second data associated with the particular employee in a second time period that is subsequent to the particular employee completing the particular training module. The system may then determine that the particular employee has not improved with respect to (1) the at least one metric relative to a previously determined performance of the particular employee, and (2) the at least one metric relative to other peers in a peer group that includes the particular employee. The system may then select, based on the personality type and on the type of training, a second particular training module and deliver the second particular training module to the particular employee. The set of employees selected by the system may be below a particular percentile in a standard distribution of employees.

The system may generate one or more distributions based on the metrics data in a first period, and generate one or more second distributions based on the new metrics data, the new metrics data being received via the data link in a second period, the first period being different from the second period. The recommended actions are then generated to move employees in a below-average portion of the one or more first distributions to an above-average portion of the one or more first distributions or the recommended actions are generated such that an average of the one or more second distributions is improved relative to an average of the one or more first distributions.

A method according to an implementation of the invention may include receiving metrics data and storing the metrics data in a database, the database comprising non-transitory computer readable media storing the metrics data in computer readable form. The method may then generate, via first computer instructions executed on one or more processors of a computing device, one or more distributions of performers based on key performance indicators in the metrics data. The method may then generate, via the first computer instructions executed on the one or more processors of the computing device, one or more persona models characterizing variables in an upper percentile of the one or more distributions. The method may then train one or more machine learning models based on the one or more persona models to identify one or more result effective variables associated with the key performance indicators, the one or more machine learning models including computer-executable instructions. The system may then receive new metrics data, via a data link from one or more user devices, and evaluating the new metrics data relative to the one or more persona models. The method may then automatically generate, via the one or more machine learning models with the computer-executable instructions trained on the one or more persona models, recommended actions associated with the one or more result effective variables. The method may also train one or more classifiers of the one or more machine learning models to identify and predict performance based on the one or more persona models.

One or more non-transitory computer-readable media storing instructions executable by one or more processors to perform operations including receiving metrics data and storing the metrics data in a database, where the database includes a non-transitory computer readable media storing the metrics data in computer readable form. The computer instructions may generate, via first computer instructions executed on one or more processors of a computing device, one or more distributions of performers based on key performance indicators in the metrics data, and may generate one or more persona models characterizing variables in an upper percentile of the one or more distributions. The computer instructions may also train one or more machine learning models based on the one or more persona models to identify one or more result effective variables associated with the key performance indicators, where the one or more machine learning models are computer-executable instructions. The computer may receive new metrics data, via a data link from one or more user devices, and the computer instructions may evaluate the new metrics data relative to the one or more persona models. The computer instructions may then automatically generate, via the one or more machine learning models with the computer-executable instructions trained on the one or more persona models, recommended actions associated with the one or more result effective variables.

The system monitors employee activities for a predetermined period of time (e.g. N days, N>0) and groups employees with same (or similar) job functions. Within these role groups or corporate hierarchy levels, the system may generate upper percentile model employees and identify actual employees that can be improved (e.g., below average to average, average to above average) based on their metrics. The system may then determine areas that need improvement and prioritization (e.g., based on company goals, based on department goals, general improvement, etc.). Based on highest priority areas, the system may select, for employees identified as needing improvement, a technique (e.g., training) to improve the employees' performance. The selection of the technique is based on what has been proven to have highest effectiveness in the company or for that employee personality/learning profile, or other personal characteristics. The system may then deliver the selected technique (e.g., training) to the employees. In subsequent periods, the system may measure the results of the training for the employees in the improvement areas. If desired result was not achieved, the machine learning may alter its logic and perform further analysis. The system may then repeat one or more of the pieces of the process, such that additional training is selected, or other improvement areas are selected to meet the goals.

Aspects of the present disclosure may be embodied as an apparatus, system, method, or computer program product. Accordingly, aspects of the present disclosure may take the form of an entirely hardware embodiment, an entirely software embodiment (executed on hardware) or an embodiment combining software and hardware aspects that may all generally be referred to herein as a "model," "device", "module", "component", "cloud" or "system." Furthermore, aspects of the present disclosure may take the form of a computer program product embodied in one or more computer readable storage media having computer readable program code embodied thereon in non-transitory format.

Many of the functional units described in this specification have been labeled as components, in order to more particularly emphasize their implementation independence. For example, a component may be implemented as a hardware circuit, an application specific integrated circuit (ASIC), executed compiled code stored on computer readable media, or a combination. A component may also be implemented in programmable hardware devices such as field programmable gate arrays, programmable array logic, programmable logic devices or the like.

Components may also be implemented in software for execution by various types of processors. A component of executable code may, for instance, comprise one or more physical or logical blocks of computer instructions which may, for instance, be organized as an object, procedure, or function and may be compiled into executable form for execution on a processor. Nevertheless, the executables of an identified module need not be physically located together but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices. The data may be structured (e.g. tables, relational database, etc.) and unstructured (e.g. language text, pictures, etc.). Where a component or portions of a component are implemented in software, the software portions are stored on one or more non-transitory computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing. In addition, any of the hardware servers including processing servers and database servers may be implemented in the cloud as server or computing resource instances. The servers described herein may be implemented as a single server (e.g. multiple databases on a single hardware device) or spread across multiple servers. The system architecture or hosting servers and monitoring servers may be embodied as a mix of hardware assets and cloud assets.

More specific examples of the non-transitory computer readable storage medium would include the following: a portable computer diskette, a hard disk (HDD), a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a magnetic disk, a magnetic storage device, integrated circuits, other digital processing apparatus memory devices, or any suitable combination of the foregoing, but would not include propagating signals. In the context of this document, a computer readable storage medium may be any tangible medium that can contain or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

FIG. 1 depicts a computing system 110 that may form the back end of a corporate human resources management department. The computing system 110 collects data from multiple sources that may characterize the company workforce and provide metrics of performance. The corporate work force may comprise multiple levels in a hierarchy with, for example, agents on the front line, and managers, senior managers, and executives above the agents in that order in the hierarchy. Each level may have its own respective metrics of performance. The computing system 110 utilizes the data collected from the multiple sources and applies machine learning logic to separate the result effective variables from the other metrics. From one or more select metrics for the employee, the system generates distributions of performance and uses the upper percentile employees to model balanced outcomes. The system then applies trained machine learning logic to produce recommendations based on the result effective variables and the balanced outcome models.

The recommendations identified by the machine learning may focus on driving improvement in the result effective variables that have been determined (during training) to be associated with the metrics in the balanced outcome models. These recommendations may include actions such as training that may be customized and delivered automatically to the employee. After one or more rounds of actions and detected improvements (or lack thereof), machine learning logic may be trained to provide customized actions to each agent based on learned connections between past performance and employee characteristics (e.g. psychological profile, experience, tenure, etc.). Thus, the computing system 110 automates the identification of methods for improvement and automatically trains average employees towards higher percentile outcomes and lower percentile employees towards average performance, shifting the performance distribution upwards.

FIG. 1 depicts a computing system 110 composed of various hardware, storage media, and input/output (I/O) connections. In particular, database servers 120 and processing servers 130 may form computer system 110, and the computing system 110 may include other peripherals such as access terminals, virtual private network (VPN) connections, and hardware input devices (e.g. mouse, keyboard, video cameras, etc.) that transfer data in and out of the computing system 110. Additionally, one or more of these peripheral devices may provide control instructions to the computing system 110 or configure one or more data tables of the database servers 120. The separation between the one or more database servers 120 and the one or more processing servers 130 is purely exemplary and may be encompassed by a single computing device with one or more storage media and one or more hardware processors. The computing system 110 may be implemented as hardware cloud assets that are dynamically allocated or assigned (e.g. thinly provisioned volumes). Even as cloud assets, the computer program instructions that perform system functions are executed on hardware CPUs and storage media of servers in the cloud.

The database servers 120 may operate as hardware servers each including memory, processors, input/output (I/O) ports, and/or long-term storage (e.g. solid state drive (SSD), hard disk drive (HDD), optical drives), or may operate as virtual machines, or instances of operating systems (e.g. Red Hat Linux, Microsoft® (MS) Windows®, etc.). The database servers need not be a plurality of computing devices and may comprise a single physical storage device with one or more databases. A database may be a hierarchical database, a relational database (e.g. structured query language (SQL), MariaDB, etc.), an object database, a NoSQL database, graph database, or other structured or unstructured data storage method. The databases on the one or more database servers 120 may be connected or combinable via one or more data keys.

The database servers 120 may receive/send data via a data bus 140 which may operate on one or more routers, one or more intermediate network attached storage drives, one or more network switches, one or more software defined switches, and/or one or more receivers and transmitters (e.g. radio frequency, infrared, satellite, optical fiber, BLUETOOTH, WIFI, etc.). The data streams or packets provided over one or more of these interfaces may be encapsulated in end-to-end encryption (e.g. secure shell (SSH), secure socket layer (SSL)), secure data links (e.g. transport layer security (TLS)), or other data protocols. The data bus 140 may be hosted or physically located with the database servers and/or may be connected to the database servers by one or more data connections (e.g. gigabit ethernet (GBE), peripheral component interconnect express (PCIe), fiber, etc.).

The data bus 140 may connect to data link 112 which may serve as a common link to various data providers (e.g. customer relationship management (CRM) applications, telephony applications, text or content mining applications, payroll providers, or government databases). That is, data link 112 may serve as a client-side application specific programming interface (API) for host APIs operated by these various data providers. The data from the data link 112 may be structured or unstructured data requested or automatically sent by the data providers or host applications.

Figure 2:
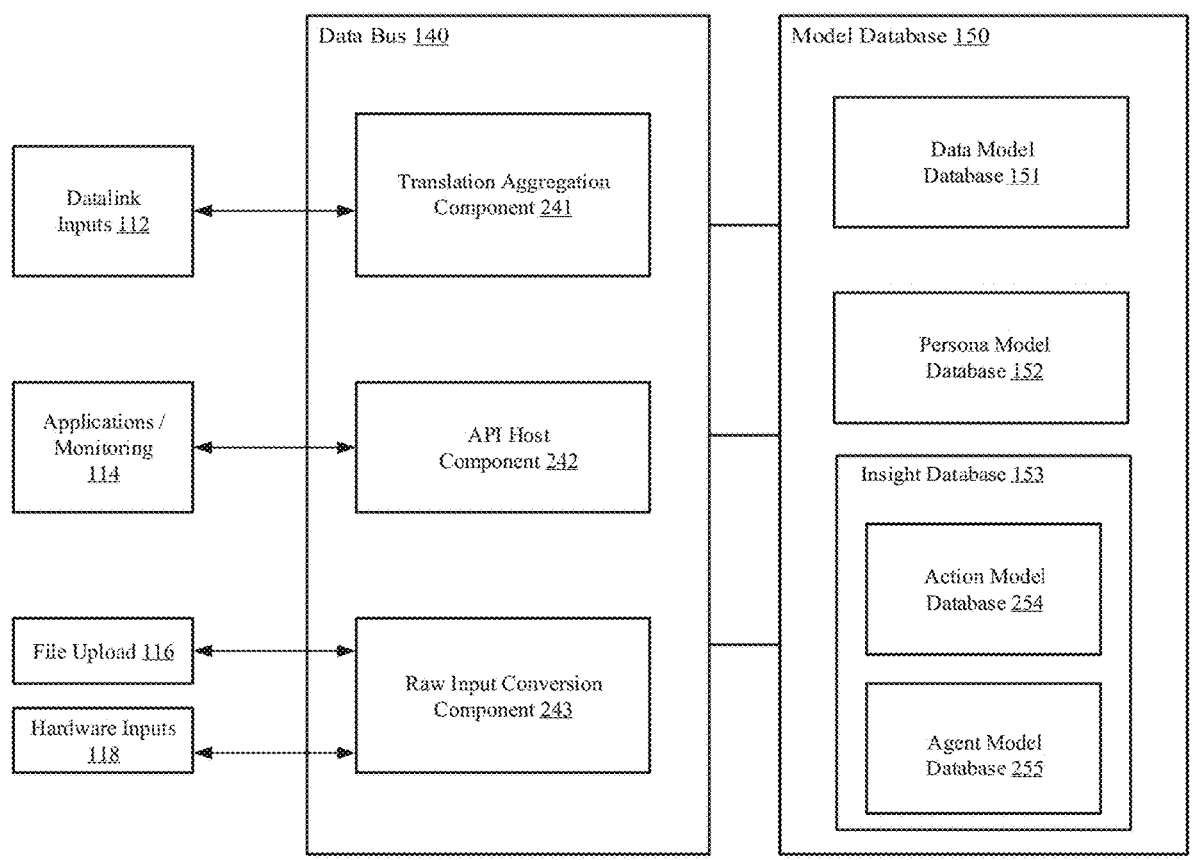
FIG. 2 is a block diagram of a system that includes data bus and database servers of the computer system according to some embodiments.

The data bus 140 may also send receive data via one or more APIs 114 hosted by the data base 140. These APIs 114 may provide an interface for outside systems (e.g. voice over internet protocol (VOIP), email, etc.) to connect as clients. The APIs 114 may be hardware and/or software interfaces (e.g. internet of things (IoT) hubs, PHP hypertext preprocessor (PHP) web APIs, representational state transfer (REST) API, etc.) formed separately or as part of the data bus 140. The APIs 114 may automatically connect to employee devices to receive telemetry feeds at start up. The APIs 114 may be hosted on the database server 120 as illustrated in FIG. 2 and extend connections to applications or devices.

The data bus 140 may also provide file server connection protocols (e.g. file transfer protocol (FTP), secure copy protocol (SCP), etc.) for file upload 116 or provide various hardware ports in various specifications (e.g. serial, small computer system interface (SCSI), universal serial bus (USB), etc.) for direct hardware inputs 118. The data provided via the file upload 116 or hardware inputs 118 may be structured and/or unstructured data. The file upload 116 and/or the hardware inputs may be associated with a graphical user interface (GUI) that overlays the connection protocols or utilizes the input of the connections.

Examples of data sources for the data link 112, the API 114, file upload 116, or the hardware inputs 118 include, but are not limited to email logs, activity monitors, phone call recordings, phone call transcripts, and/or call logs. An agent's desktop computer, for example, may be monitored for CPU usage, mouse movement, words per minute, application logs, and other indicators of activity. Likewise, customer relations software may monitor the contacts the agent has with customers (e.g. the phone call characteristics, outcome, sales, etc.) and compile that information into a structured table form. For instance, structured data may be relational tables, B-trees, object models, or other database structures which may then be imported over the data link 112. In other embodiments, the unstructured data may be provided by network attached end-user computers, web servers, database servers or other network attached computing devices. Unstructured data is data which has not been organized into an easily sortable or accessible form for a computer and can be text or non-text, without a format or explicit dimensions or a data structure usable by a computer program. For example, unstructured data in the text form can be files, websites, emails, cell phone messages, chat application logs, reports, etc., and unstructured data in the non-text form can be audio, video, images, etc. In one embodiment, data link 112 or file upload 116 are provided to a user through a user interface, from which the user selects the appropriate data sources for extracting pertinent data.

The data bus 140 may store the data packets or data blocks in one or more databases or relational tables of the data base servers 120. One or more of these database servers 120 may host or store a model database 150 which may include a data model database 151, a persona database 152, and an insight database 153. A data model, generally, may be a data-based characterization of a real world sample of a population, a time-series trend, or other correlation that may be simplified or reduced from the data. One or more of the data model database 151, the persona database 152, and the insight database 153 may be independently hosted. The model database 150 may form one or more combinations of the data in the data model database 151, the persona database 152, and the insight database 153 utilizing one or more data keys to join one or more tables from the individual databases. The model database 150 may also have one or more temporary databases for storing data received over one or more periods from the data bus 140.

The model database 150 and/or one or more of the data model database 151, the persona database 152, and the insight database 153 may be connected to the processing servers 130 and more specifically to the recommendations component 160. The processing servers 130 may be one or more hardware servers which include memory, one or more processors, and I/O ports, or may be virtual machines executing on one or more hardware servers, or may be operating system instances executing on one or more servers or computing devices.

The recommendations component 160, the actions delivery component 170, and the role allocation component 180 may be executed on the same server or individual servers. The recommendations component 160 may train and apply machine learning logic to the data in the database servers. The actions delivery component 170 may apply recommendations and also customize them to employees based on machine learning logic trained based on past actions and their success with different employee types. The role allocations component 180 may then add another layer of sorting and automation for assigning actions and recommendations to various roles in the corporate hierarchy.

These three components are ordered as serially connected in FIG. 1, but maybe connected in a number of ways (e.g. parallel) as is illustrated further below. In particular, the recommendations component 160 may generate recommendations that are then passed to the actions delivery component 170 to determine how to execute. The recommendations from the recommendations component may also bypass the actions delivery component 170 and may be routed by the roles allocation component 180 for implementation. The roles allocation component 180 and actions delivery component 170 may also provide feedback to the recommendations component 160. The machine learning in some cases may feed off or learn from the other products of the machine learning logic of other components (e.g. recommendations component 160 learns from the success of actions allocation component 170).

The one or more servers, or one or more processors executing the recommendations component 160, the actions delivery component 170, and the role allocation component 180 may be connected by one or more high speed data buses (e.g. PCIe, serial AT attachment (SATA), or GBE) and/or may share memory (e.g. RAM, NVRAM) or cache for efficient sharing of data during processing. The processing servers 130 may provide processed data back to one or more databases of the database servers and/or the APIs 114 of the data bus 140. Additionally, the processing servers 130 may be authorized to transmit one or more control instructions to one or more user terminals, agent devices, or agent GUIs as part of the execution of the recommendations component 160, the actions delivery component 170, or the role allocation component 180.

Figure 3:
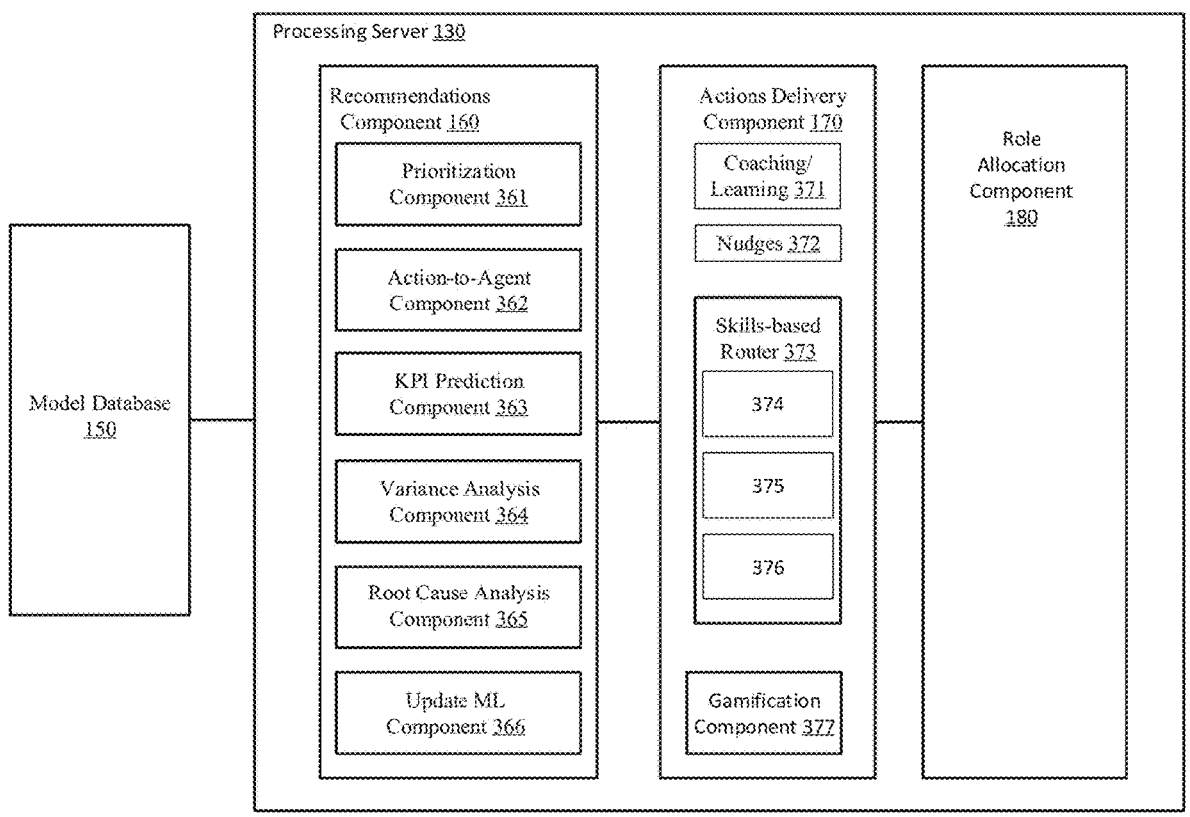
FIG. 3 is a block diagram of a system that includes the processing servers of the computer system according to some embodiments.

The database portion of the computing system 110 is illustrated in more detail in FIG. 2 and the processing portion of the computing system 110 of FIG. 1 is illustrated in more detail in FIG. 3. For ease of understanding, the computing system 110 is not illustrated in FIG. 2 or FIG. 3. The database servers 120 may be implemented as cloud computing resources encompassing hardware assets in the cloud. In addition in FIG. 2, more detail on the data bus 140 and the insight database 153 are illustrated. Generally, the model data base 150 may acquire data from a number of sources, which may be formatted in a number of formats or unformatted. The data in the model database 150 may, preferably, be of a singular format for easy co-use or sharing of data between the databases of the model database 150 and parallel use by the various ML logic components of the recommendations component 160. Thus, the data bus 140 operates to standardize, combine, and order the data received from the various sources into similarly-formatted, cross-keyed databases. Though the data may predominately flow into the model database 150 from the various sources, both the model database 150 and data bus 140 may communicate with the various sources.

In particular, the datalink inputs or data link 112 (e.g. feeds from SALESFORCE, MS ACCESS, Discovery DATALINK, etc.) may connect to a translation and/or aggregation component 241 of the data bus 140 which may be accomplished via one or more APIs. One or more applications or monitoring services may connect as clients to the API host component 242 of the data bus 140. The file upload 116 and the hardware inputs 118 may be connected to the raw input conversion component 243 which may process unstructured data in these inputs. Structured data from the file upload 116 and the hardware inputs 118 may bypass the raw input conversion component 243. The model database 150 may also receive structured training datasets for training the machine learning logic, which may bypass the data bus 140.

The translation and/or aggregation component 241 may operate as a data translation application to reformat input data (e.g. XML to HTML), change a structured data input of one type to a different structure (e.g. SQL to NoSQL), or parsing binary, hexadecimal, or other data feeds according to one or more protocols. The translation and/or aggregation component 241 may operate as a data aggregation application to reconstruct input data, to collect and temporarily store telemetry, data feeds, or metrics from one or more periods, and to construct one or more relational tables. The translation and/or aggregation component 241 may comprise computer programming instructions that when executed perform one or more operations on data. The translation and/or aggregation component 241 may also control one or more memory operations including buffering, caching, and swap operations. The translation and/or aggregation component 241 may also transmit data requests, receipt confirmations, hashes, checksums, or other data over the datalink inputs 112 connection to one or more third-party or external applications.

The API host component 242 may operate as an interface to deliver, send, or transmit executable code, code objects, methods, or data objects, or the like. The API host component 242 may also operate as an interface to receive executable code, code objects, methods, or data objects, or the like. The API host component 242 may allow the combination of two or more APIs to form an application executing on the data bus 140, or various access protocols may allow local execution of code from one or more authorized applications connecting to the API host component 242. The API host component 242 may host one or more application programming interfaces that may be private (e.g. local to virtual private network (VPN)), authorized (e.g. by client-side certificate), or public. The one or more APIs of the API host component 242 may be sandboxed.

The raw input conversion (MC) component 243 may receive unstructured data in bulk from one or more interfaces including the datalink inputs 112, the applications and monitoring connection (client APIs) 114, the file upload and hardware inputs 118. One or more parsing applications may identify the data received and select one or more intelligent data processing algorithms or transmission protocols to provide structure to the received data. For example, the intelligent data processing algorithms may include natural language processing (NLP) applications, long short-term memory (LTSM) sequencing applications, convolutional neural networks (CNN), recurrent neural networks (RNN), or other structure identifying processes. The transmission protocols for parsing may include transport transmission control protocol/Internet protocol (TCP/IP), user datagram protocol (UDP), moving pictures experts group (VIPEG), universal serial bus (USB), or other hardware and software transmission protocols. The MC component 243 may also determine the appropriate model of the model database 150 for placement of the data structured by the MC component 243 or the MC component 243 may forward the structured data to the translation and aggregation component 241 for further processing.

The API host component 242 and the raw input conversion component 243 may accept databases of structured data for placement on the database servers 120 or in the model database 150. For example, backup copies of the various models of the model database 150, historical databases, test databases, or initial databases at implementation may be imported via these interfaces and passed through to the appropriate locations on the model database 150 (e.g. agent model database). The RIC component 243, API host component 242, and translation and/or aggregation component 241 may also receive real time feeds of structured data that are placed completely or in part in one or more databases of the model database 150.

The datalink inputs or data link 112, the client-side API or applications/monitoring interface 114, the file upload 116, and hardware inputs 118 may connect to any of the RIC component 243, API host component 242, and translation and/or aggregation component 241. In some implementations, the datalink inputs or data link 112, the client-side API or applications/monitoring interface 114, the file upload 116, and hardware inputs 118 may connect to the RIC component 243, API host component 242, and translation and/or aggregation component 241 based on the transmission protocol, one or more packets or certificates received, one or more handshakes or exchanges with remote applications, received code objects, or other switching or triggering information. Furthermore, the RIC component 243, API host component 242, and translation and/or aggregation component 241 may connect with each other and/or may operate as one component in some implementations of the data bus 140.

The model database 150 may be a database environment where one or more database structures (e.g. relational tables) may be stored, connected, joined, queried, and/or processed. These database structures may include a data model database 151, a persona model database 152, an insight database 153, where the insight database 153 may include an action model database 254 and an agent model database 255. These databases may form separately structured database instances or may be formed of one or more relational tables or other data structures. These databases may be distributed over one or more of the database servers 120.

The data model database 151 may store time series data of one or more periods of agent activity and/or action delivery records. The data from different periods of agent activity enables back testing, machine learning training and re-training, and record review. In some implementations, one or more periods may be stored as summary data or distributional data. In addition, logic models, neural network layers, classifier models, or other decision maps may be stored in the data model database 151. Therefore, the data model database 151 may regularly exchange data with the recommendation component 160 such that the data model database 151 receives updated data models and may provide updated data to the machine learning logic of the recommendations component 160.

In an exemplary implementation, the data model database 151 may store agent metrics including call logs, voice analytics, CRM outcomes, survey results, resolution times, and other efficiency metrics and quality metrics. In addition, the data model database 151 may store one or more logic models that define one or more connections between metrics or define one or more result effective variables. The result effective variable, generally, may be determined by a correlation between variables where causation may be limited to a single direction. That is, the result effective variable may represent a driving factor in other metrics or outcomes of more importance to the company. Advantageously, machine learning logic can separate result effective variables from non-causal variables when the separation would not be apparent to a manager.

The data model database 151 may store one or more logic models that define correlations or regression fits for present and/or past periods of agent performance, team performance, manager performance, or customer satisfaction along with associated metrics. A correlation is a relation existing between variables or metrics which tend to vary, be associated, or occur together in a way not expected on the basis of chance alone (e.g. relative to a control group). For example, if response rate and sales both increase throughout Fridays, then the two outcomes may be said to be correlated. Regression analysis is a way of evaluating correlation between variables and may result in a regression fit which maps a trendline or polynomial equation to the relationships between the two or more variables. In a time series correlation, one or more periods may have a correlation between variables while other periods may have no correlation or statistical relationship between the variables. Advantageously, machine learning logic is able to distill these differences between periods and variables to determine which variables are driving other variables to correlate or not in various periods. These differences distilled by the machine learning logic are then recorded in the logic of the classifier or in layers of the neural network.

Furthermore, if the recommendations component 160 operates on a standard period of time, then the model database 150 may store past models, interpretations, and mappings for prior periods. This functionality may enable a reset function to correct or reset machine learning to a prior state based on a model developed at or up to a prior period. As noted previously, the machine learning logic may use the differences over time of the variables and metrics for the agents to learn how each of the metrics relate to each other in the real world. To ensure that the learned relationships between metrics are generally applicable, the machine learning logic may test itself against other periods. If the relationships also hold in those periods, the learned logic is kept or finalized. If the relationships do not hold in another period (i.e. the machine learning logic fails back testing), then the machine learning logic attempts to re-train its logic based on the prior period and the other periods of data available to it. Thus, multiple periods of data are useful for repeated rounds of testing and training for the machine learning.

The data model database 151 may store the metrics and variables for these periods as well as distributions of these metrics and variables in each period. The data model database 151 may also store human resources data such as agent resumes, experience, start dates, resident addresses, local office addresses, and other career data. For instance, in a first period, the distribution may be a normal distribution or bell curve where 68% of the agents fall within a single standard deviation of the median of the distribution, and 95% fall within two standard deviations. In subsequent periods, the system may have moved some of the agents towards the upper end of the distribution, indicating success of the recommendations and actions suggested by the machine learning logic. This process may be performed by the machine learning logic but may rely on the data stored in the data mode database 151. The data model database 151 may also store predicted distributions developed by the recommendation component 160 or the actions delivery component 170. The projected or predicted distributions or metrics may be directed to a best case, worst case, trendline extrapolation, or may be predicted based on an automatically delivered action, a recommended coaching, or other action taken or recommended by the system. These predicted models or distributions may also be referenced by the recommendations component 160 in an improvement process or a re-training process of the machine learning logic. These training and re-training processes are explained in more detail with respect to FIGS. 6-7 and 17 below.

The persona model database 152 may store exemplary or representational agent metrics for one or more agents in an upper end (percentile), middle portion (percentile), lower end (percentile), or other portion of a performance distribution. Advantageously, the representational agent may be a composite or average of metrics at the corresponding portion of the distribution. In this way, the metrics selected by the system may be achieved by individual employees as a combination and also balanced so as to not reduce quality or efficiency. Conventional systems may select one or two metrics to be used to rate employees, but these metrics are not checked to ensure that they do not drive perverse incentives (e.g. hanging up on customers to reduce call time) or are impossible to achieve.

The persona models stored are balanced in that no one metric is over-emphasized at the expense of others because the personas are drawn from the actual agent or employee distribution. The persona models may be formed from one or more high performing employees that have correctly balanced priorities or succeeded in one or more metrics. The persona models may be formed from an aggregate of high performing employees by selecting their balanced metrics for the persona. From these persona models, the machine learning logic may determine the various limits of each metric and may identify the relative limits of each metric. This prevents the machine learning logic from recommending goals or driving actions to achieve lopsided outcomes (e.g. upsales in every customer issue resolution) which may ultimately hurt the business. Machine learning logic may be applied to identify the personas or to build the persona models from multiple distributions of metrics. Therefore, the achievable metrics of the personas are used to train the machine learning logic and to serve as corporate goals where quality, effectiveness, and efficiency need not be sacrificed.

The persona model database 152 may store result effective variables of an exemplary or representational agent in an upper end (percentile), middle portion, lower end (percentile), or other portion of a performance distribution. The performance distribution may follow a normal distribution (i.e. a bell curve) where 68% of the population is substantially within one standard deviation of the median and 95% of the population is substantially within two standard deviation of the median. Additionally, any distribution, even if not a normal distribution, may be divided into percentiles which represent a 1/100th segment of the distribution from low value to high value (e.g. 99th percentile is high). Advantageously, the result effective variable may be different from the key performance indicators (KPI) of the representational agent that are to be improved. For example, the primary driver for sales dollars per customer contact (a KPI) may be empathy in the conversation. Thus, the machine learning logic of the recommendations component 160 may identify the primary drivers or result effective variables for the KPIs and store those associations in the persona model database 152.

The recommendation component 160 may also identify one or more result effective variables for which actions may be delivered that correlate with agent metrics. That is, follow up data related to the actions may be stored in the model database 150, the use of this data is described in more detail with respect to FIGS. 3 and 6-7. The result effective variables and/or representational metrics of various percentiles may also be stored for various levels of the hierarchy or for various agent types. For example, a persona model may be stored as the median values of metrics in the top 5% of the distribution of agents, where the distribution may be of the highest performing agents not the highest metrics in the distribution of each metric. These persona models may be used for training and re-training of the machine learning logic and may be generated for specific time periods, company departments, or other segments of the data. As explained further in relation to FIGS. 3, 6 and 7, the machine learning logic of the components on the processing servers 130 may determine vectors for improvement based on prior agent improvement, the result effective variables, or employee specific conditions.

A persona of the persona model database 152 may be an exemplary or representational agent with a single value for each metric, an array of various equivalent combinations of metrics, or an array of various weighted combinations of metrics, where the combinations represent equivalent balanced performances at one or more percentiles of an overall distribution. The metrics of a persona may also have additional statistical measures such as variance, skew, uncertainty, or confidence intervals associated with each metric. Personas from prior time periods may also be stored by the persona model database 152 to record improvement or changes in the distribution. The specific KPIs for a distribution that forms the personas may be configured or selected via a GUI, by automatic prioritization based on the business sector, or based on CRM data identifying immediate or seasonal needs of customers.

The insight database 153 may include an action model database 254 and an agent model database 255. While the data model database 151 and the persona model database 152 focus on storing insights or result effective variables for performance related metrics, the insight database 153 may focus on result effective variables of various actions which may be taken by the system and may focus on personalization models to train specific agents appropriately based on their strengths, experience, learning methods, or psychological indicators. In particular, various actions such as training videos, call scripts, learning games, reminders, or other improvement features may be stored in the action model database 254 with or without associated models. In the case that an action is connected or correlated with a model, the model may define certain outcome uncertainties or an effectiveness confidence interval of the action, may define a distribution of vectors for metrics that are associated with the action, or may simply associate one or more KPIs or result effective variables with the action. In defining a distribution of vectors (i.e. changes in agent metrics over time), one or more vectors towards a lower percentile may represent metrics that are adversely affected by the action while one or more vectors towards a higher percentile may represent metrics that are improved by the action. A vector may represent numerically (e.g. 0.3%, 1.2x) the expected or predicated change for one or more variables over a unique period or the standard system evaluation period. These models may then be used by the machine learning logic of the action delivery system 170 to customize and optimize action delivery as explained further below.

The agent model database 255 may store psychological profiles of agents (e.g. Myers-Briggs), learning styles of agents, past effective actions or characteristics of actions, strengths or weaknesses from reviews, and predicted skills based on individual metrics combinations (e.g. upselling rates and quick call resolution for sales). The past effective actions associated or connected with an agent may also have vectors of metric change or improvement for the action delivered to that agent. Various customizations made to one or more actions based on the profile of the agent may also be stored in the agent model database 255. The action delivery component 170 may routinely connect with the agent model database 255 and the action model database 254 to adjust recommendations made by the recommendations component 160 to specific situations (e.g. fashion week, product launch, or superbowl) or to specific agents. The models stored in the agent model database 255 and the action model database 254 may be classifiers, neural network layers, or other machine learning mappings that may map general recommendations to customized actions. The models stored in the agent model database 255 and the action model database 254 may also be representative psychological profiles or statistics (e.g. success of empathy training for INTJ Meyers-Briggs category), representational results or metrics for categories of training (e.g. sales improvement percentage for de-escalation training). Other insight models besides those examples illustrated in FIG. 2 may also be stored in the model database 150 or the insight database 153, including customizing models and mappings.

As noted with respect to FIG. 2, the model database 150 stores various databases of structured data which may be more readily accessible and usable forms of data received from the various sources connected to the one or more database servers 120. Similarly, FIG. 3 relates to one or more processing servers 130 that may perform the bulk of the data analysis and machine learning execution. The machine learning logic and other applications of the processing servers 130 may request and receive data from the model database 150 while also assisting in building the model databases as described with respect to FIGS. 6-7. Generally, the components of the processing servers may execute ML logic that reads in data from the model databases 150 and may generate recommendations and actions based on those models to improve employees or agents at one or more levels of a performance distribution.

The recommendations component 160 may train and apply machine learning logic to the data in the database servers. The actions delivery component 170 may apply recommendations and also customize them to patients based on machine learning logic trained based on past actions and their success with different employee types. The role allocations component 180 may then add another layer of sorting and automation for assigning actions and recommendations to various roles in the corporate hierarchy.

FIG. 3 depicts the various processes, methods, components and/or applications operating on the one or more processing servers 130 of the computing system 110. The model database 150 is connected for data and model delivery. The processing server 130 may have a recommendations component 160, an actions delivery component 170, and a role allocation component 180, or other components. The recommendations component 160, the actions delivery component 170, and the role allocation component 180 may comprise executable computer program instructions that when executed cause one or more processors of the one or more processing servers 130 to perform various functions or to issue instructions to connected systems such as agent terminals, the database servers 120, and other devices. For example, the executable computer program instructions may be software applications or machine learning models. Like the database servers 120, the processing servers 130 may be implemented or refer to hardware assets in the cloud and accessible by the internet. Thus, the processing components of the recommendations component 160, the actions delivery component 170, and the role allocation component 170 may be execute on dynamically assigned processing cores of cloud servers such that the hardware processing cores form a fundamental processing unit for the execution of the components.

The recommendations component 160 may include sub-components including a prioritization component 361, an action-to-agent component 362, a KPI prediction component 363, a variance analysis component 364, a root cause analysis component 365, and a machine learning (ML) update or re-training component 366. These sub-components may be interconnected via one or more interfaces, or via shared memory on the processing server 130, or via shared variables (e.g. global variables of the recommendations component 160), or via shared functions or objects. For example, the action-to-agent component 362 and the KPI prediction component 363 may call a shared machine learning logic block or function call that correlates data with agent specifics.

The prioritization component 361 may provide a GUI for selection or configuration of one or more KPIs as a priority, one or more optimization routines, or one or more outcomes. The one or more optimization routines may be machine learning classifiers, regression models, logic rules, or other data mappings. The optimization routines may be automatically selected by the prioritization component 361 based on other selected priorities or based on deviations from standard (e.g. ISO 9000/9001) in a time period. A priority may be a ranking or focus of a feature above the ranking or importance of another feature. A priority may also be defined by or based on one or more goals or targets. The priority may be to advance or increase production, quality, sales, or customer experiences, such that the priority allows the prioritization component 361 to select one or more machine learning routines that address at least one root cause of the priority, one or more rules that address at least one root cause of the priority, or one or more result effective variables that form.

The recommendation component 160 itself may comprise one or more machine learning routines that operate on the data models of the data model database 151 and optimize based on the persona model data in the persona model database 152. The recommendation component 160 may execute machine learning logic including one or more of an extra trees classifier, a catboost classifier, an extreme gradient boost classifier, a light gradient boost machine, a gradient boosting classifier, quadratic discriminant analysis logic, linear discriminant analysis logic, a random forest classifier, logistic regression logic, naïve bayes, an ada boost classifier, a K-neighbors classifier, a decision tree classifier, a state vector machine (SVM) with a linear kernel, a ridge classifier, LTSM logic, NLP logic, recurrent neural networks (RNN), convolutional neural networks (CNN), multi-level perceptrons, feedforward neural networks, or other supervised or unsupervised machine learning logic. The prioritization component 361 may select one or more of the machine learning routines to execute based on the priority metrics, outcomes, or result effective variables. For example, one or more ML routines may be more accurate than others at predicting specific variables and, therefore, generates better recommendations. Thus, the prioritization component 361 may include rules that select use of various machine learning logic based on input priorities.

Additionally or alternatively, the prioritization component 361 may operate or execute a voting classifier that executes two or more of the ML models or classifiers above and selects one or more top performing classifiers (e.g. most accurate). The output of the top classifiers selected by the voting classifier may be combined by the voting classifier of the recommendation component 160 into an ensemble classifier or prediction output. For example, the output of the top classifiers may be combined by a weighted average based on accuracy. The output may be one or more recommendations. The selection of the priorities is described in more detail with respect to FIGS. 8-14 below.

The recommendations generated by the recommendation component 160 may comprise computer instructions to applications of the actions delivery component 170 to perform various actions or categories of actions. The recommendations generated by the recommendation component 160 may comprise computer instructions for informing the actions delivery component 170 which skills to target. The recommendations generated by the recommendation component 160 may comprise information displayed to a GUI for an agent's supervisor or an office trainer. The recommendations component 160 may store recommendations, create a timeline of recommendations, or a sequence of recommendations, where an order of the sequence may be determined by the ML logic to improve outcomes relative to a different order. The recommendations component 160 may also provide mapping data to assist the actions delivery component 170 in mapping actions to agents or customizing actions for agents.

One or more of the ML classifiers or models may be configured to identify recommendations based on variance to persona. For example, an agent may vary from the persona metrics or a range defined by the persona model in one or more metrics, or one or more skills. The ML classifier may be trained to analyze the result effective variables to correct that correlate with various metrics. The ML classifier may then map those metrics where an agent is below par (e.g. below median) based on variance to one or more recommended actions to address a root cause of the deficiency. As a part of the training process of the ML classifier of the recommendations component 160, it may identify one or more result effective variables that form the basis for recommendations.

One or more of the ML classifiers or models may be configured to identify recommendations based on the best path or sequence of actions to arrive at one or more target metrics. These target metrics may be persona-based goals (e.g. increase performance of top 10 percentile or persona model by 2%) or distribution-based goals (e.g. shift median performance). While the target metrics and the ML classifiers optimized for those target metrics may be associated with general improvement targets for agents (e.g. increase upselling by 5%), the ML classifiers may still customize recommendations for agents, departments, or groups of agents. The one or more ML classifiers or models may be configured to identify recommendations based on the goals assigned to an agent, such that based on variance from the goals one or more actions are recommended.

The action-to-agent (A2A) component 362 may be a ML routine, model, or set of rules that is optimized to customize actions for agents. In particular, the actions recommended by the A2A component 362 may be based in part on one or more psychological profiles of the agent, one or more language analysis engines (e.g. voice empathy), one or more surveys, or one or more agent reviews. For example, if an agent is classified as one category on Myers-Briggs then rules or scripts may be automatically provided for training or if an agent is classified as a different category on Myers-Briggs then video and role playing games may be automatically provided for training. An agent's record or metrics may also be analyzed for variance day to day or event to event and training for consistency may instead be provided to target various metrics if an agent demonstrates the ability in certain periods. The action-to-agent (A2A) component 362 may utilize these capabilities to assist the recommendation component 160 after general recommendations have been determined or may assist the actions delivery component 170 in action delivery and skills-based routing. The action-to-agent (A2A) component 362 may be called as a function or executed as a sub-routine by the recommendations component 160 and/or the actions delivery component 170.

The KPI prediction component 363 may generate one or more predictions of the change of a KPI in one or more future periods. The predicted change may be a vector to be used for comparison against vectors in historical data from prior periods in the data model database 151. The predicted change(s) may include a confidence interval or predict a range of possible changes (e.g. 5% improvement+/−0.5%). The KPI prediction component 363 may called as a function or executed as a sub-routine by the recommendations component 160, the prioritization component 361, and/or update ML component 366 to assist in calculation of outcomes from recommendations.

The variance analysis component 364 may compare agent metrics to a persona model to determine the variance between the agent and the persona model for one or more metrics. The variance analysis component 364 may compare agent metrics or department metrics or manager metrics against a persona model or a distribution to determine variance from the model or the median of the distribution. The variance analysis component 364 may also determine a confidence interval around other metrics or predictions of the recommendations component 160. The variance analysis component 364 may comprise machine learning logic that is trained to identify metrics or variables that drive reductions in variance as well as mathematical logic to calculate variance, skew, and other distributional measures. The variance analysis component 364 may be called or executed as a function or sub-routine of the recommendations component 160 at a beginning of a process or routine for the determination of a recommendation.

The root cause analysis component 365 may be one or more machine learning classifiers trained to determine from the data models database 151 which variables or metrics are result effective variables (e.g. causative variables). The one or more machine learning classifiers may select one or more control agents and observe/analyze metric changes over one or more periods in the control agents and other agents to determine effects of one or more variables on other metrics. The one or more machine learning classifiers of the root cause analysis component 365 may be trained using at least in part control data from agents outside the system covered or monitored by the APIs 114 or from a period prior to system delivered actions. The root cause analysis component 365 may identify result effective variables and store/transmit the result effective variables to the data models database 151 or the insight database 153.

The recommendations component 160 may call or execute as a function or sub-routine root cause analysis component 365 as an intermediate point in a process or routine for the determination of a recommendation and may utilize one or more variances from the variance analysis component 364. The root cause analysis component 365 may also be called or executed at a beginning of a process or routine for the determination of a recommendation, for instance in a truncated determination (e.g. using prior variables/metrics), a follow up determination (e.g. using new and old variables/metrics), or other determinations. The prioritization component 361 may call or execute the root cause analysis component 365 to determine which metrics to prioritize or to determine how to balance the prioritization of metrics and/or actions.

The recommendations component 160 may store trained classifiers, models, and neural layers on the model database 150. These trained classifiers may then be called or executed to process data by the recommendations component 160. These trained classifiers, models, and neural layers may require periodic updates or re-training. To accomplish updating or re-training, the recommendations component 160 may call or execute the update ML component 366 which may re-map one or more neural layer connections, or re-assess correlations, fits and characteristics of classifiers. The update ML component 366 may, for example, model the conditional density functions of one or more classifiers or may perform discriminative training of the one or more classifiers (e.g. minimize loss in the fit) or may update priors for a Bayesian learning model. The update ML component 366 may also perform any initial training and re-training needed for the machine learning logic of the recommendations component 160.

The recommendations component 160 is connected to the actions delivery component 170 via one or more hardware or software interfaces and/or one or more shared memory allocations on the processing server. Other connections are contemplated. The actions delivery component 170 may include a coaching/learning component 371 that may be a website, video stream, or other software/computer-delivered training for agents. The coaching/learning component 371 may also automatically connect one or more agents to one or more live coaches, trainers, or motivational speakers. The coaching/learning component 371 may also automatically deliver a coaching or learning action based on an availability of the agent, the availability of the agent being monitored by an API of APIs 114.

In general, the actions delivery component 170 operates machine learning logic and other computer instructions to automate and optimize delivery of actions (e.g. training) to agents and other employees of the company. In an exemplary implementation for a ride-share company, based on driving metrics and recommendations from those metrics derived as noted above, an actions delivery component 170 may automatically deliver to drivers driver training (perhaps in real time) on specific areas needed for improvement of customer reviews when the drivers are determined to not be driving a customer or otherwise occupied. Therefore, the agents receive customized training that may be optimized by machine learning to improve their performance from one percentile (or absolute value) in a distribution of metrics to a higher percentile (or absolute value) in a distribution.

The actions delivery component 170 may include a nudge component 372 which comprises one or more content delivery functions and may deliver chat messages, notifications, text messages, pop-up windows, or other notifications to agents being monitored by one or more systems connected to the actions delivery component 170. The actions delivery component 170 may include a gamification component 377 that allows agents to compete for various metrics (e.g. issue resolution time), or awards agents when they hit a threshold (e.g. sales per week), or compiles weekly VIP charts for the office, or other goal-oriented or motivational recognition (e.g. points, badges, certifications). These motivational concepts and techniques may encourage agents to use the new training tools and collaborate with each other—both to improve the tools and to better their ability to perform their tasks. The gamification component 377 may also deliver one or more training games on demand (or automatically) to one or more agents. The gamification component 377 may place hurdles or challenges into a game based on the metrics of the agent that need improvement or based on information or instructions from the recommendations component 160.

The skills-based router 373 of the actions delivery component 170 may assess one or more skills of an agent (e.g. through tests, CRM data, or surveys) and/or utilize metrics or variances from the recommendations component 160 to assess the skills of one or more agents. The skills-based router 373 may also record which agents have been trained by the system in various areas. The skills-based router 373 may then receive one or more actions or tasks for an agent to complete (e.g. customer calls) and the skills-based router 373 may route the one or more actions or tasks to agents connected to the system based on the skills assessed for the agents. For example, the skills-based router 373 may include an email, chat and lead router 374 that uses text analysis to determine content of the email, chat or lead (e.g. request for product information) and may assign the response to an agent with skills related to the content. For example, the skills-based router 373 may include a case router 375 that uses text analysis and agent notes to determine case history and needed skills (e.g. conflict resolution) for resolving the case, and may assign (or re-assign) the response to an agent with skills related to those needed. For example, the skills-based router 373 may include a call router 376 that uses voice analysis to determine content (e.g. primary reason for the call); and the call router 376 may assign the response to an agent with skills related to the content. Depending on the tasks available for agents, the skills-based router 373 may have one or more specialized router components that assign or route tasks based on content or skills required/requested.

The role allocation component 180 may also function as a router and may deliver various actions customized by the A2A component 362 and the actions delivery component 170 to various roles across a corporate hierarchy (e.g. manager, trainer, controller, team leader, executive, director). The actions delivered through the role allocation component 180 may be delivered via a GUI which may be in the form of a dashboard that appears differently for various roles. For agents it may provide a human resources data on file with the company as well as content related to recent metrics, past metrics, periodic goals (e.g. monthly goal), notifications, optional training, and other task assistance. The role allocation component 180 may execute one or more computer instructions to generate the GUI and display content on a computer display or other display for various roles. The types of metrics displayed may vary across the hierarchy. Exemplary implementations of these GUIs are described in more detail in respect to FIGS. 15-16.

Figure 4:
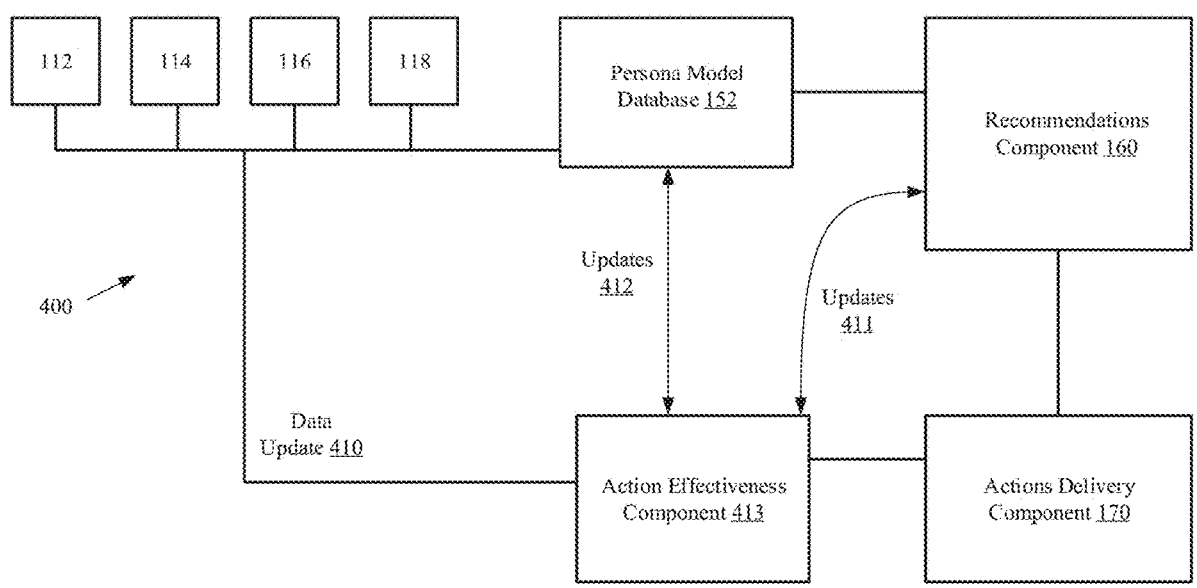
FIG. 4 is a block diagram of a system that includes various components in the decision chain of the computer system according to some embodiments.

FIG. 4 depicts the continuous or repeated flow of data through a system 400 according to an implementation of the invention. Specifically, the various processors of the data along the loop may include certain key elements from FIGS. 1-3 as well as additional components and may include any of the components of FIGS. 1-3, the ones being depicted in FIG. 4 being purely exemplary. FIG. 4 illustrates in greater detail how and when the various updates from machine learning logic may be made to prior (earlier in the process chain) machine learning logic and when they may be made to the persona model database 152 (and other databases).

The inputs or interfaces of FIGS. 1-2, data link inputs 112, API clients 114, file upload 116, and hardware inputs 118, are illustrated as connected to the information flow of the system 400 and may begin a machine learning training or update of the system. The model database 150 may receive the inputs (e.g. 112, 114, 116, 118) and store the data from the inputs. The data may also be stored as one or more persona models characterizing certain percentiles or ranges in the distribution of the data. These persona models may be stored in persona model database 152 for reference by other components. The recommendations component 160 may read or retrieve the persona model from the persona model database 152 and generate one or more recommendations or direct one or more actions to be delivered by the actions delivery component as described with respect to FIG. 3. Likewise, the recommendations component 160 may provide updates to the persona model database 152 over the same link and may build additional models for placement in the persona model database 152 or other databases for later use by the processing components (160, 170, 180).

The actions delivery component 170 may deliver the actions recommended by the recommendations component 160 and may customize one or more of the actions before delivery to an agent terminal or may delay delivery until the agent is available (e.g. not busy). The action effectiveness component 413 may then receive information regarding the timing of the delivery of the action and an initial assessment of the success of the action (e.g. agent quiz score). The action effectiveness component 413 may also received periodic data updates 410 from the data bus 140 and inputs 112-118. These periodic data updates 410 may be higher frequency than the updates to the persona model and/or may be before the changes are reflected in the data model database 151.

The action effectiveness component 413 may evaluate the effectiveness (e.g. subsequent success of agents) of various actions and may transmit instructions or updates 411 to the recommendations component 160 to conduct AB testing or control-based testing within the generated recommendations. For example, the recommendations component 160 may determine a pool of agents are candidates for a first action or a second action (e.g. training the same skill) and split the pool into A and B to gauge the relative effectiveness of the two actions. The pool of candidates may advantageously be selected to be largely similar. The action effectiveness component 413 may then ascertain the outcome of the test and update via 411 the weighting or decision logic of the recommendations component 160 so that the more successful action may be preferred. Similarly, the action effectiveness component 413 may instruct the recommendations component 160 to conduct control group testing where no action is delivered to a portion of a group that would have been recommended the action.

The action effectiveness component 413 may also provide training data to one or more classifiers or machine learning models of the recommendations component 160 to update them via re-training. The action effectiveness component 413 may also add or remove one or more result effective variables from the machine learning logic of the recommendations component 160 based on their effectiveness. The action effectiveness component 413 may also provide updates 412 to the persona model database 152 based on the effectiveness of actions. The action effectiveness component 413 may also update the insight database 153 and specifically may update the mapping models of the action model database 254 and the agent model database 255 based on the effectiveness of action across various categories of agents (e.g. experienced/inexperienced). The action effectiveness component 413 may be a sub-component or sub-routine of the update ML component 366 or may be connected to it. The action effectiveness component 413 may identify the most effective learning methods and the most effective coaches.

Figure 5:
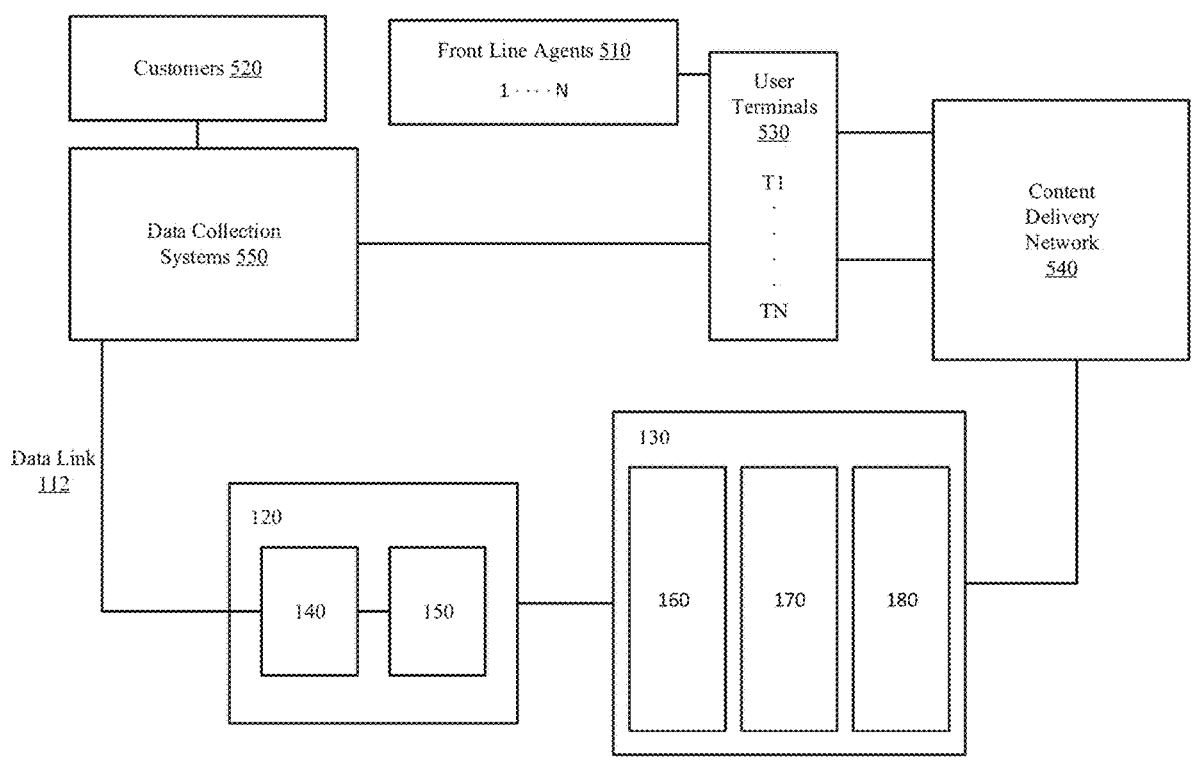
FIG. 5 is a block diagram of a system that includes data sources and flow through the computer system according to some embodiments.

FIG. 5 depicts a physical connection loop between systems according to an implementation of the invention. Data link 112 connects the data bus 140 to data collection systems 550 (e.g. CRM, voice analytics, sales recording, etc.). The data bus 140 is part of the one or more database servers 120 which also provide a model database 150. The database servers 120 connect to one or more processing servers 130, the processing servers executing applications including the recommendations component 160, the actions delivery component 170, and the role allocation component 180. The overall computing system 110 may be present but is not shown. The processing servers 130 connect to a content delivery network 540 (e.g. database servers) which may include video and website hosting, live gaming, and other educational or training content. The actions delivery component 170 or the role allocation component 180 may instruct the content delivery network 540 to deliver content to a plurality of user terminals (T1-TN) 530 where N is any positive integer. A plurality of front-line agents (1-N) 510 may view the terminals which may be computer displays, televisions, handheld devices, or other displays. The content and/or actions delivered to the user terminals may be displayed in one or more GUIs of the user terminals 530 that may be controlled by the processing servers 130, the action delivery component 170, or the content delivery network 540. The content delivery network 540 may be implemented as a cloud-based resource in order to scale quickly to the training/coaching needs at any given time.

The data collection systems 550 may also connect to the user terminals 530 and may monitor one or more user actions, tasks, or workspaces. These data collection systems 550 may convert the monitoring data into structured data (e.g. relational tables) for export over the data link 112 to the databases of the database servers 120. The data collection systems 550 may also connect to one or more customers 520 and receive feedback on one or more front-line agents 510 or may receive feedback on experience at a specific time monitored by the data collection systems 550. The data collection systems 550 may also connect via APIs 114. The connections illustrated in FIG. 5 may be two-way connections, and/or may be hardwire or wireless connections, and/or may include GBE, PCIe, WIFI, Internet (TCP/IP), and other connections. The data collection systems 550 may be cloud-based storage or servers connected to various data collection applications operating on employee terminals or it may be implemented as a hybrid of cloud and local hardware assets.

Figure 6:
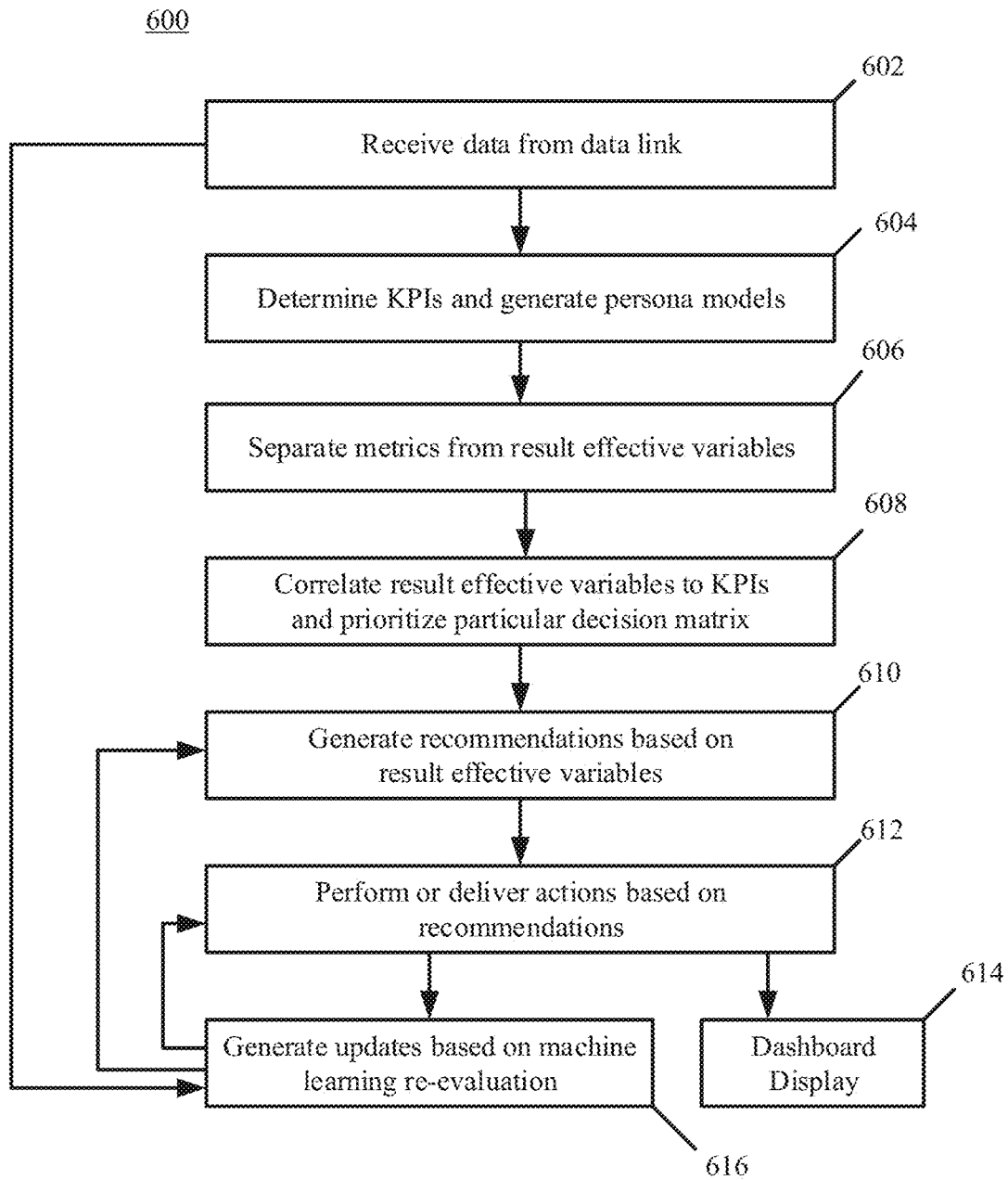
FIG. 6 is a flow diagram of a method for processing data through the computer system according to some embodiments.

FIG. 6 illustrates a process 600 for determining recommendations and delivering actions according to an implementation of the invention. The process may begin by monitoring employee activities for a predetermined period of time (e.g. 30 days) and may group employees with same (or similar) job functions, psychology, experience, or other categories. The employee activities that are monitored may be sales revenue, customer contacts, time logged in or available, and other computer or phone monitored statistics. From these monitored metrics, the process may then select or determine the KPIs and generate models of ideal employees. Based on these models and KPIs, machine learning logic may identify employees that can be improved (e.g. below average to average, average to above average). Based on these models and KPIs, machine learning logic may determine areas that need to be prioritized (e.g. based on company goals, based on department goals, general improvement, etc.). Based on highest priority areas, the process may select, for each agent, a technique (e.g. training) to improve the employee performance. Selection may be based on what has been proven to have the highest effectiveness in the company or for that employee personality/learning profile, for example. The process may then deliver the selected technique (e.g. training) to the agent. In subsequent monitoring periods, the process may measure the result of the action delivered to each agent. If the desired or predicted result is not achieved, further analysis may be performed to update and optimize the machine learning logic of the various components being executed.

At 602 of the process 600, the system (e.g. computing system 110) may receive data from a data link (e.g. data link 112, APIs 114, etc.). At 604, the system may determine KPIs and generate persona models, where the KPI determination may be the result of prioritization (e.g. by prioritization component 361). The persona models may be derived from the received data and stored in persona model database 152. At 606, the system may separate or sift through metrics in the received data and the persona models to determine one or more result effective variables by applying machine learning logic to training sets of the data and to further test data sets.

At 608 in FIG. 6, the system may correlate result effective variables to KPIs and prioritize a particular decision matrix. The choice or determination of the decision matrix is further described in relation to FIGS. 8-14 below. The correlation of result effective variables to KPIs may be performed by the machine learning logic of the recommendations component 160 or one or more models or classifiers stored on the data model database 151 and executed on the processing servers 130. The correlation by the machine learning logic may identify causal relationships between the result effective variables and the KPIs such that improvements in the result effective variables will drive improvement in the KPIs. At 610, the system may generate recommendations based on the result effective variables (e.g. at the recommendations component 160). The recommendations may be directed at improving one or more result effective variables so that further or other metrics are improved (e.g. KPIs). At 612, the system may perform or deliver actions (e.g. via action delivery component 170) based on recommendations generated in the prior process 610.

At 614, the action may be displayed on a dashboard, the dashboard being a GUI that may be hosted on the content delivery network 540. At 616, the system may generate updates based on machine learning re-evaluation, learning, or re-training. The updates may be provided to the process 612 and/or to the process 610. The process 616, may receive data from the data link (e.g. data link 112 or APIs 114) to drive the machine learning updating as part of process 602 in a subsequent period (e.g. newer data). The process for updating and improving machine learning accuracy with iterations through separate data sets is described in more detail with respect to FIG. 17. The data received at process 616 may be post-action data for evaluation of one or more actions delivered at process 612. One or more of the processes 602-616 of process 600 may be computer instructions that when executed cause one or more processors to perform the functions of the respective process.

Figure 7:
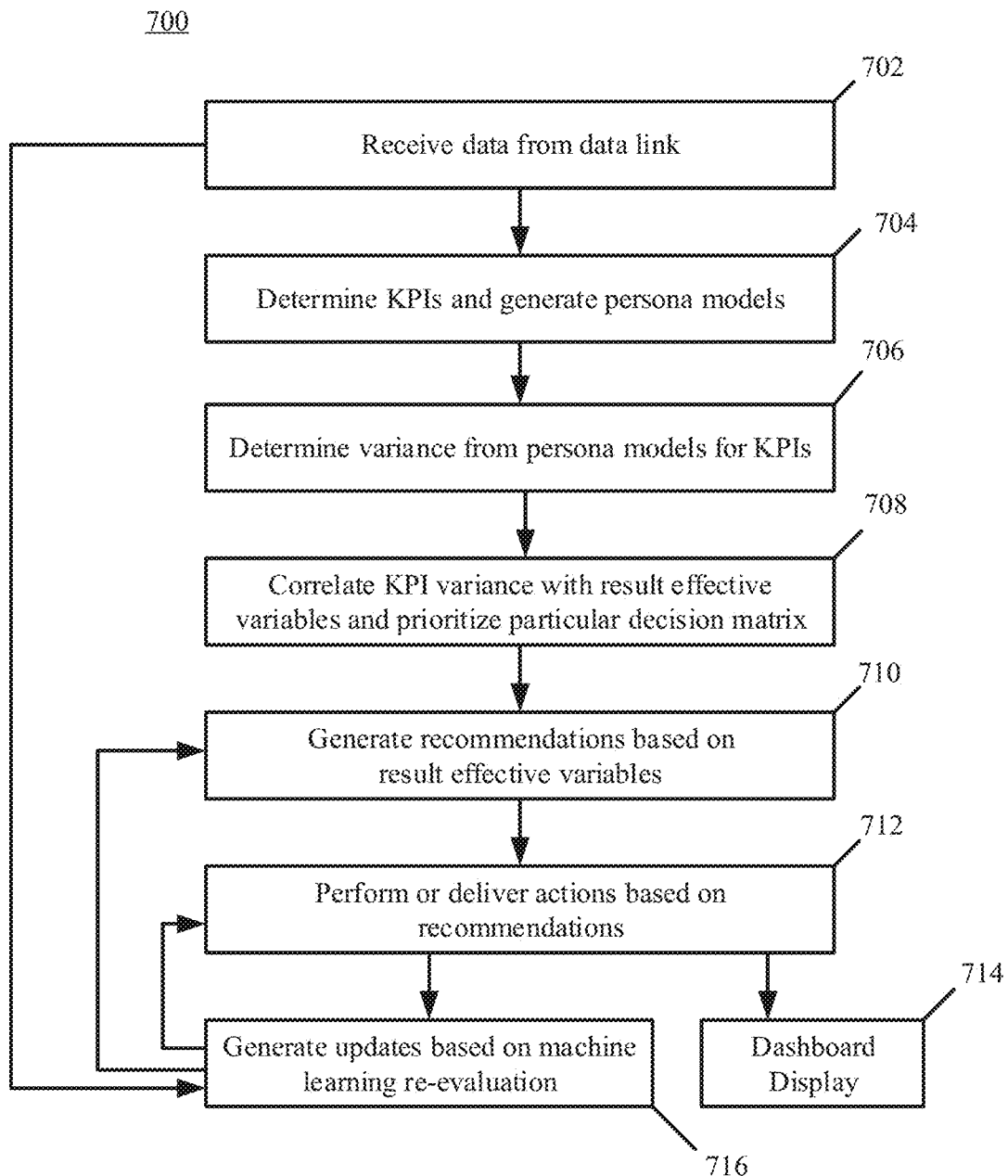
FIG. 7 is a flow diagram of a method for processing data through the computer system according to some embodiments.

FIG. 7 illustrates a process 700 for determining recommendations and delivering actions according to an implementation of the invention. Many of the sub-processes of FIG. 7 overlap with those of FIG. 6. The process 600 is focused on driving or improving the appropriate result effective variables that have been identified by the machine learning as likely to result or cause corresponding improvement in the KPIs. The process 700 is focused on a process which uses persona models to characterize the model agent or employee and then map the persona to the KPIs using machine learning logic. In a subsequent subprocess, the variance of KPIs for employees or agents from the persona model's KPIs is correlated with result effective variables. In the case of process 700, the result effective variables may be targeted by the machine learning logic to be those that drive the high performance of the persona models. That is, rather than identifying which variables may cause the KPIs, the process may identify the variables that cause the persona model to outperform. Thus, process 600 and process 700 may arrive at different solutions or recommendations and may identify different cause effective variables that are likely to improve performance if improved themselves. Process 600 and process 700 may also be executed in parallel for comparison of results.

At 702, the system (e.g. computing system 110) may receive data from a data link (e.g. data link 112, APIs 114, etc.). At 704, the system may determine KPIs and generate persona models, where the KPI determination may be the result of prioritization (e.g. by prioritization component 361) or a personal goal of an agent. The selection of priorities is described in more detail with respect to FIGS. 8-14 below. The persona models may be derived from the received data. The generation of the persona models may also include the execution of machine learning logic to identify cause effective variables that correlate with the outcomes of the persona models. That is, the machine learning logic identifies causal ties or links between the persona model metrics and outcomes and one or more cause effective variables. As a result, the machine learning logic would predict that improvement of the cause effective variables for an employee would bring that employee closer to the persona model employee. At 706, the system may determine variance of KPIs for one or more agents from the persona models, where variance is deviation from the values of the persona model within the associated agent population distribution.

At 708 in FIG. 7, the system may correlate KPI variance (e.g. as a single value per agent) with result effective variables and may prioritize a particular decision matrix (e.g. logic rules or ML classifier). The correlation of result effective variables to KPI variance may be performed by the machine learning logic of the recommendations component 160 or one or more models or classifiers stored on the data model database 151 and executed on the processing servers 130. At 710, the system may generate recommendations based on the result effective variables (e.g. at the recommendations component 160) and KPI variance. The recommendations may be directed at improving one or more result effective variables so that further or other metrics are improved (e.g. KPIs) or KPI variance from the persona model is reduced or minimized. That is, the machine learning logic at this point may be a minimization optimization configured to improve the employees' result effective variables in order to minimize KPI variance relative to the model persona. At 712, the system may perform or deliver actions (e.g. via action delivery component 170) based on recommendations generated in the prior process 710.

At 714, the action may be displayed on a dashboard, the dashboard being a GUI that may be hosted on the content delivery network 540. At 716, the system may generate updates based on machine learning re-evaluation, learning, or re-training. The updates may be provided to the process 712 and/or to the process 710. The process 716, may receive data from the data link (e.g. data link 112 or APIs 114) to drive the machine learning updating as part of process 702 in a subsequent period (e.g. newer data). The process for updating and improving machine learning accuracy with iterations through separate data sets is described in more detail with respect to FIG. 17. The data received at process 716 may be post-action data for evaluation of one or more actions delivered at process 712. One or more of the processes 702-716 of process 700 may be computer instructions that when executed cause one or more processors to perform the functions of the respective process.

Figure 8:
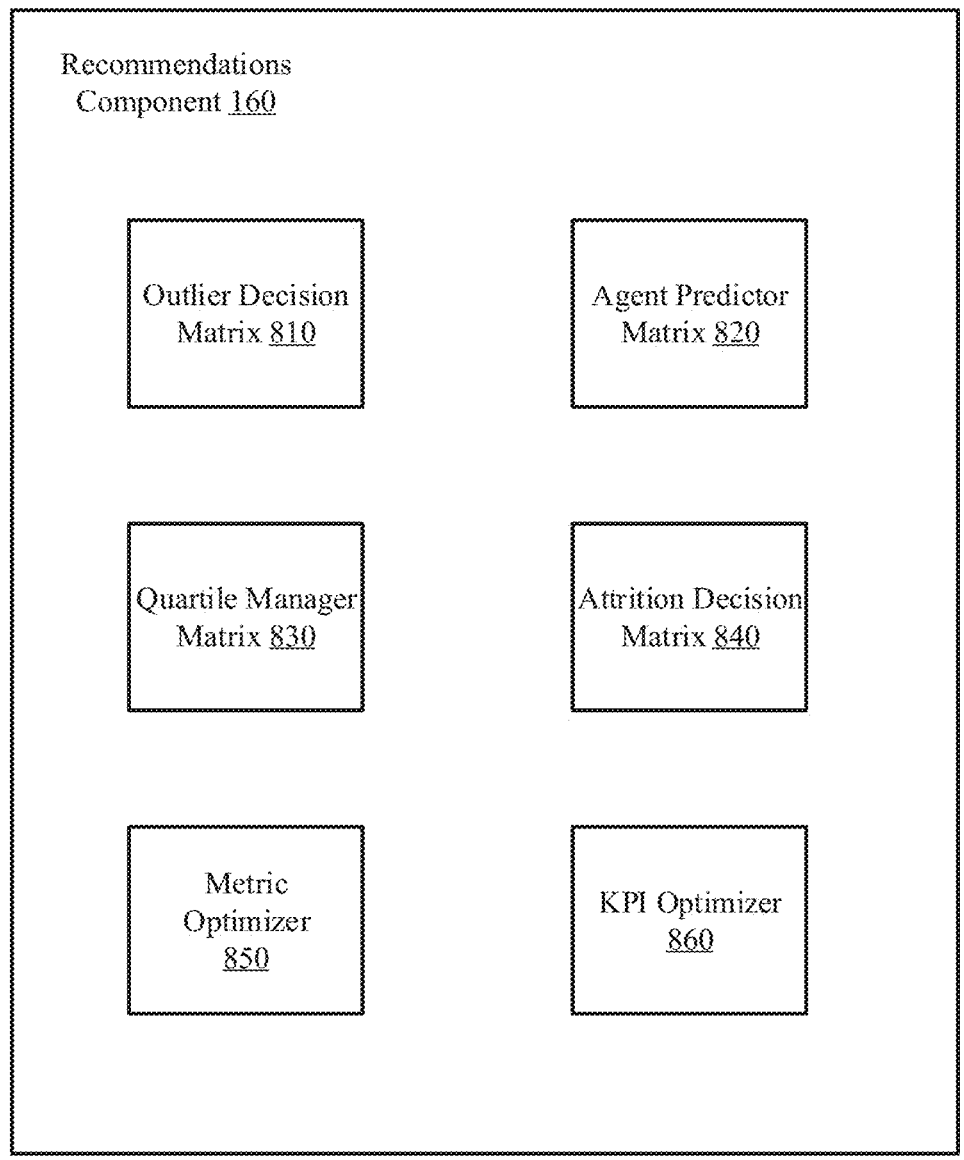
FIG. 8 is a block diagram of the recommendations component of the computer system according to some embodiments.

FIG. 8 depicts various optimizer and decision matrix options of the recommendations component 160 that may be selected or determined to form the basis for ML logic validation, evaluation, and ranking by a voting classifier. A voting classifier executes multiple machine learning models and then selects the best performing models for a combined result. The selection of the best performing models may be based on the models' accuracy in predicting one or more variables. These optimizer and decision matrix options may be a part of prioritization component 361. Selection of one of these optimizer options may adjust recommendations of the recommendations component 160 without re-training or adjustment of the ML logic. These various optimizer and decision matrix options are discussed in more detail in relation to FIGS. 9-14.

The outlier decision matrix 810 may detect outliers or outlier clusters for one or more metrics or KPIs in a distribution corresponding to the agent population and may select one or more unsupervised learning machine learning routines or applications. The agent predictor matrix 820 may optimize actions to individual agents or may optimize to enhance and sustain agent performance generally. For example, an agent that is a sensor according to the Meyers-Briggs psychoanalysis framework may receive more empathy training in order to improve their sales performance. The agent predictor matrix 820 may operate after recommendations have been generated based on result effective variables and may select one or more regression models or classification models to optimize the actions delivered for those recommendations.

The quartile manager matrix 830 may evaluate agent performance by isolating movement of agents within fixed distributions of overall performance for recommended actions and may evaluate agents against the persona models using one or more rules or correlations. The attrition decision matrix 840 may evaluate agent behavior, metrics, and characteristics to identify and mitigate risks of attrition and may select one or more regression models or classification models to generate recommendations.

The metric optimizer 850 may target action delivery that will yield largest improvements in one or more metrics. The metric optimizer 850 may select one or more metrics and, thereby, one or more result effective variables to drive one or more regression models or classification models of the machine learning logic of the recommendations component 160. The KPI optimizer 860 may leverage enterprise-wide performance indicators (e.g. revenue, sales, etc.) to identify result effective variables and shift performance on numerous metrics to meet corporate goals. The KPI optimizer 860 may select one or more regression models or classification models to generate recommendations.

Figure 9:
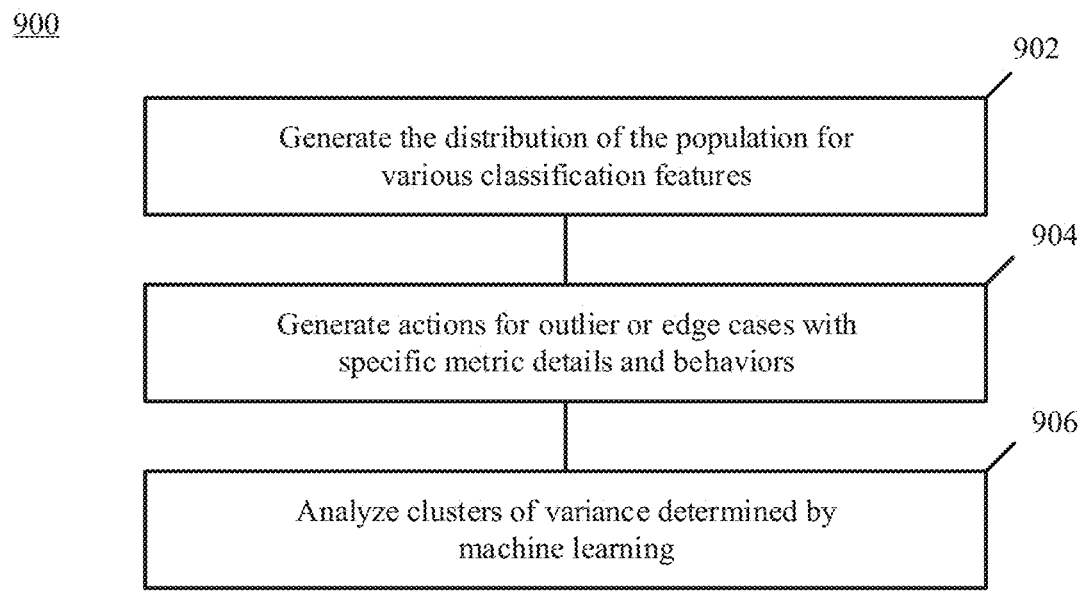
FIG. 9 is a flow diagram of a method for processing data through the computer system according to some embodiments.

FIG. 9 illustrates a process 900 of outlier decision matrix 810 which may rely on detection of outliers or outlier clusters for one or more metrics or KPIs in a distribution corresponding to the agent population. At 902, the system (e.g. computing system 110 or recommendations component 160) may generate the distribution of the agent population for various classification features (e.g. demographic information, experience). At 904, the system may identify outliers and outlier clusters using one or more unsupervised learning logic processes (or semi-supervised) and generates actions for the outliers or edge cases with specific metric details or agent behaviors. Unsupervised learning is a type of machine learning that identifies previously undetected patterns in a data set with no pre-existing labels and with a minimum of supervision. In contrast to supervised learning that usually makes use of human-labeled data at the training step, unsupervised learning, also known as self-organization allows for modeling of probability densities over inputs as the basis for training.

At 906, the system may analyze clusters of variance identified by ML classifiers and their contribution of variance to the distribution as a whole. The clusters of variance may require or drive one or more recommendations to reduce variance or shift metrics or behaviors of the cluster. The process 900 may prioritize reinforcement of behaviors identified in outliers or coaching to improve behavior. One or more of the processes 902-906 of process 900 may be computer instructions that when executed cause one or more processors to perform the functions of the respective process.

Figure 10:
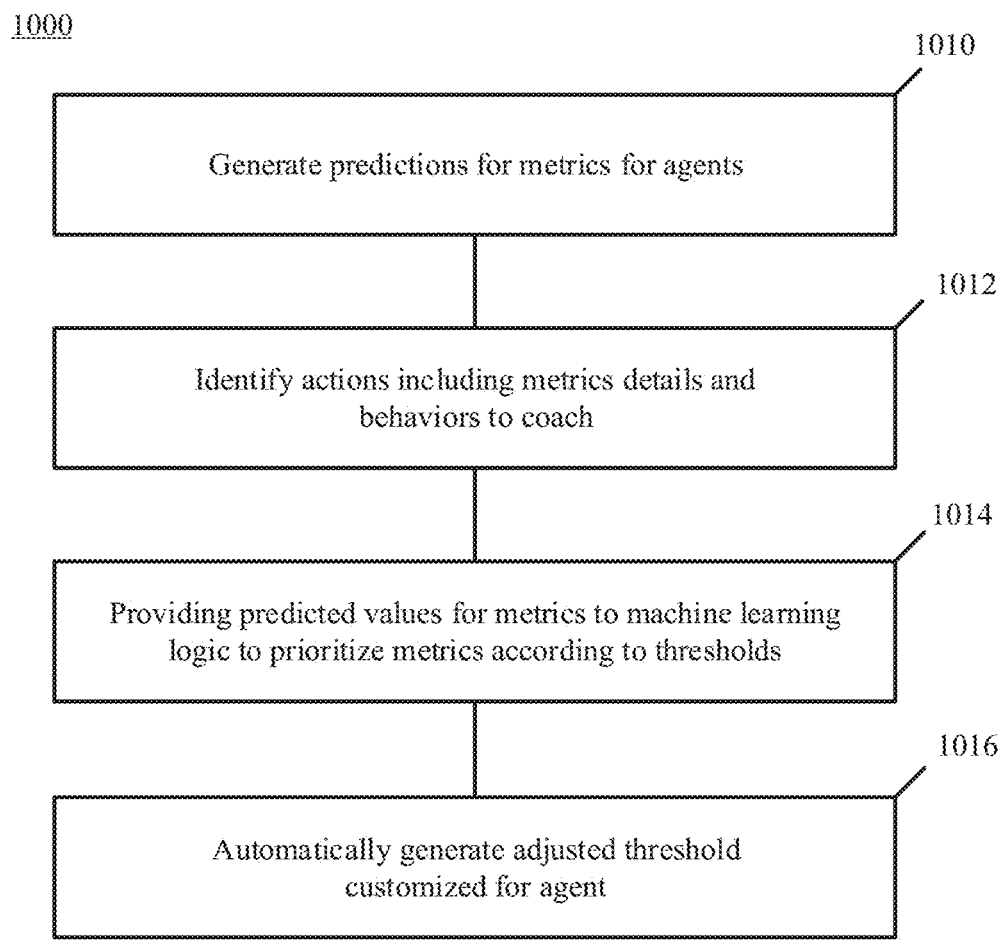
FIG. 10 is a flow diagram of a method for processing data through the computer system according to some embodiments.

FIG. 10 illustrates a process 1000 of agent predictor matrix 820 may operate to optimize the actions delivered for recommendations. At 1010, the system (e.g. computing system 110 or recommendations component 160) may generate predictions of metrics for one or more agents using ML logic and prior performance. At 1012, the system may identify or recommend actions including metrics details and behaviors to coach. At 1014, the system may provide the predicted values for metrics for agents to the machine learning logic to prioritize metrics according to goals or thresholds. At 1016, the system may automatically generate an adjusted threshold customized for agent (e.g. smart goal) based on predicted values for agent and agent metrics. One or more of the processes 1010-1016 of process 1000 may be computer instructions that when executed cause one or more processors to perform the functions of the respective process.

Figure 11:
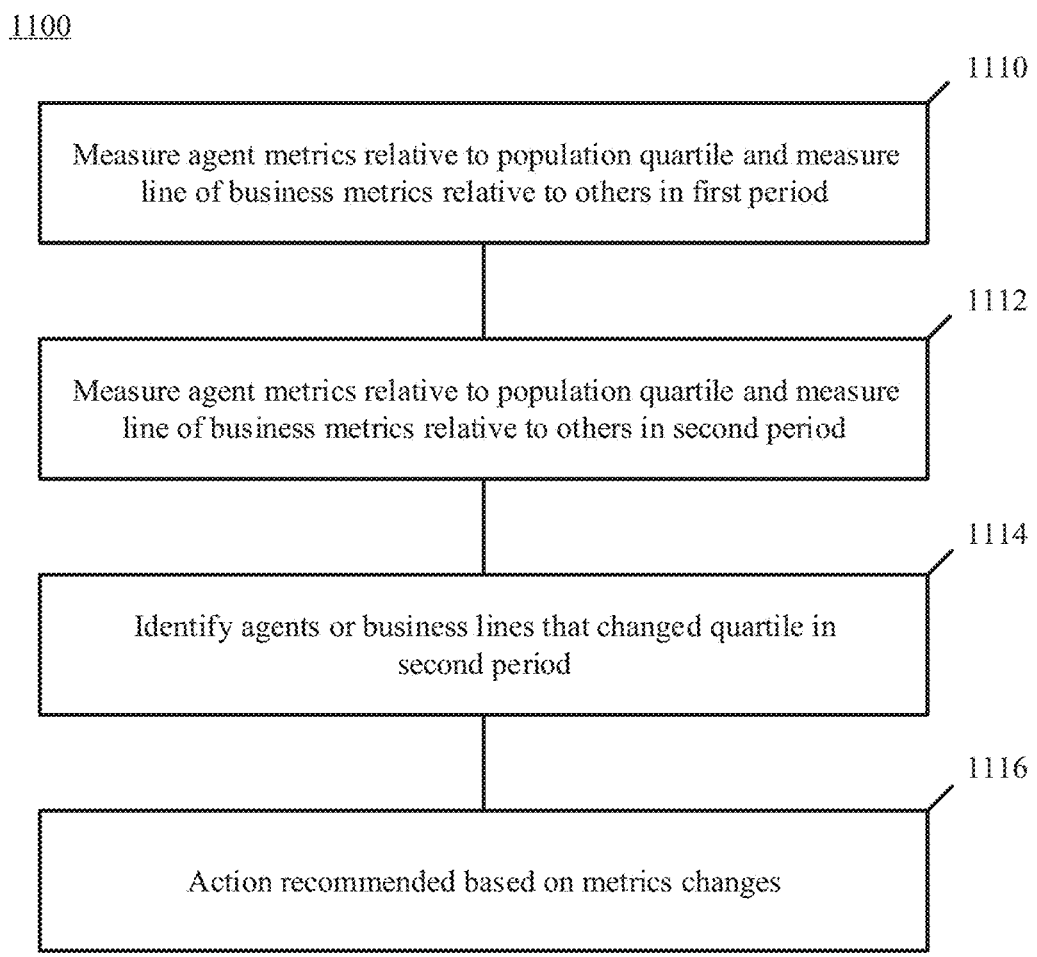
FIG. 11 is a flow diagram of a method for processing data through the computer system according to some embodiments.

FIG. 11 illustrates a process 1100 of quartile manager matrix 830 which may evaluate quartile shifts of agents within fixed distributions of overall performance. At 1110, the system (e.g. computing system 110 or recommendations component 160) may measure one or more agents' metrics relative to population quartile and/or measure line of business metrics relative to others in a first period of time. At 1112, the system may measure one or more agents' metrics relative to population quartile and/or measure line of business metrics relative to others in a second period of time. At 1114, the system may identify agents or business lines that changed quartile in second period relative to first period (or another period). At 1116, the system may automatically recommend actions based on metrics that changed resulting in quartile shift of the agent or business line. One or more of the processes 1110-1116 of process 1100 may be computer instructions that when executed cause one or more processors to perform the functions of the respective process.

Figure 12:
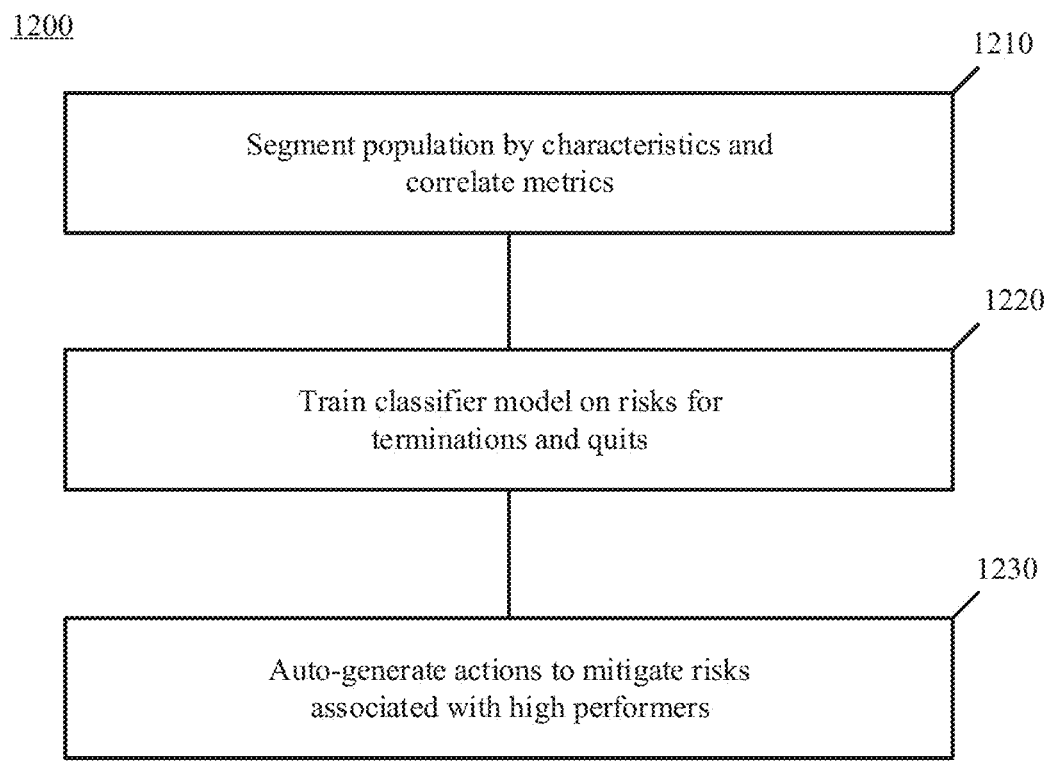
FIG. 12 is a flow diagram of a method for processing data through the computer system according to some embodiments.

FIG. 12 illustrates a process 1200 of attrition decision matrix 840 which may evaluate agent behavior, metrics, and characteristics to identify and mitigate risks of attrition. At 1210, the system (e.g. computing system 110 or recommendations component 160) may segment the population of agents by characteristics (e.g. experience, role, pay, etc.) and/or correlate metrics to characteristics. At 1220, the attrition decision matrix 840 may optionally need to train one or more classifiers or classifier models on risks of terminations and quits (e.g. attrition) based on metrics or characteristics. At 1230, the system may automatically generate action to mitigate risks of attrition identified by the classifiers based on the metrics or characteristics (e.g. pay raises for high performers). One or more of the processes 1210-1230 of process 1200 may be computer instructions that when executed cause one or more processors to perform the functions of the respective process.

Figure 13:
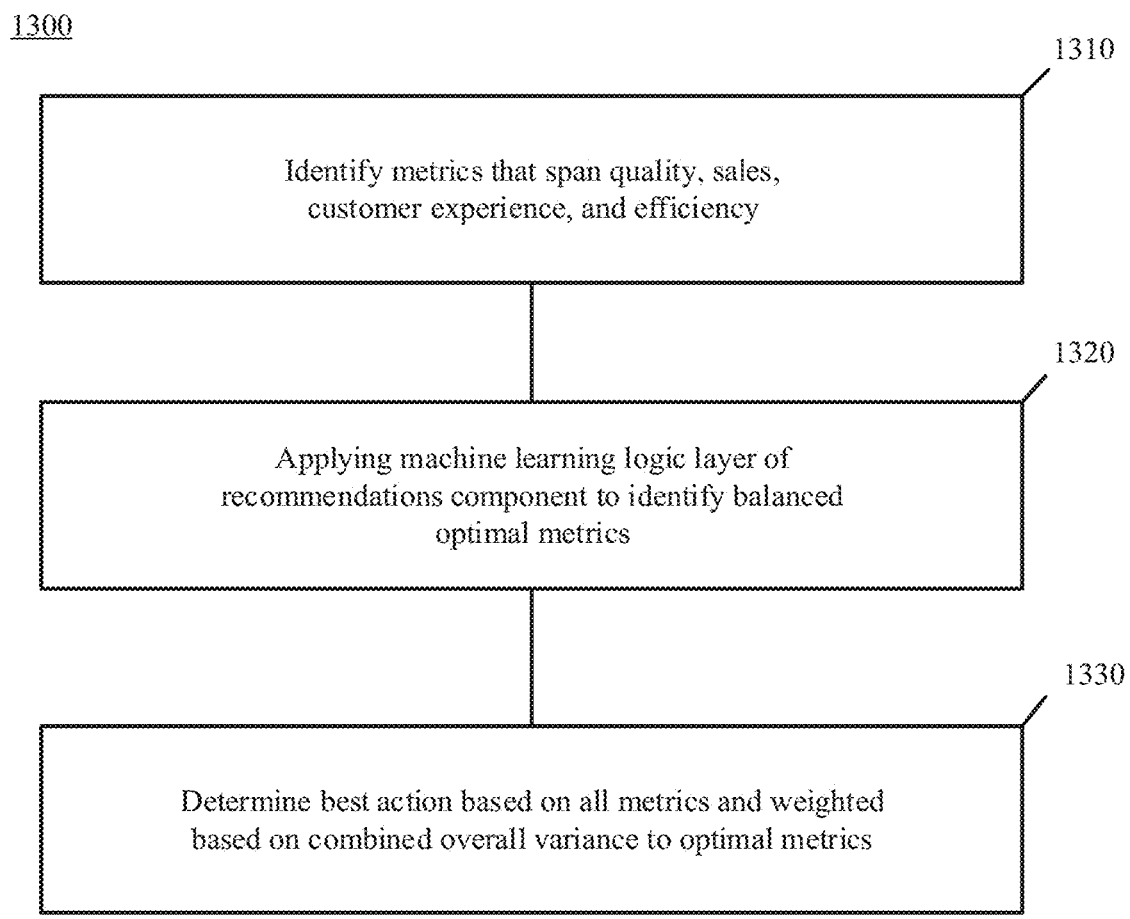
FIG. 13 is a flow diagram of a method for processing data through the computer system according to some embodiments.

FIG. 13 illustrates a process 1300 of KPI optimizer 860 which may leverage enterprise-wide performance indicators (e.g. revenue, sales, etc.) to identify result effective variables and shift performance on numerous metrics. At 1310, the system (e.g. computing system 110 or recommendations component 160) may identify key performance indicators (KPIs) that span quality, customer satisfaction, efficiency (production), and sales categories. At 1320, the system may apply a machine learning logic layer (e.g. classifiers) to identify balanced optimal metrics for business or agents. At 1330, the system may determine the best action to deliver based on all metrics and weighted on a per-agent basis based on combined overall variance to optimal metrics. One or more of the processes 1310-1330 of process 1300 may be computer instructions that when executed cause one or more processors to perform the functions of the respective process.

Figure 14:
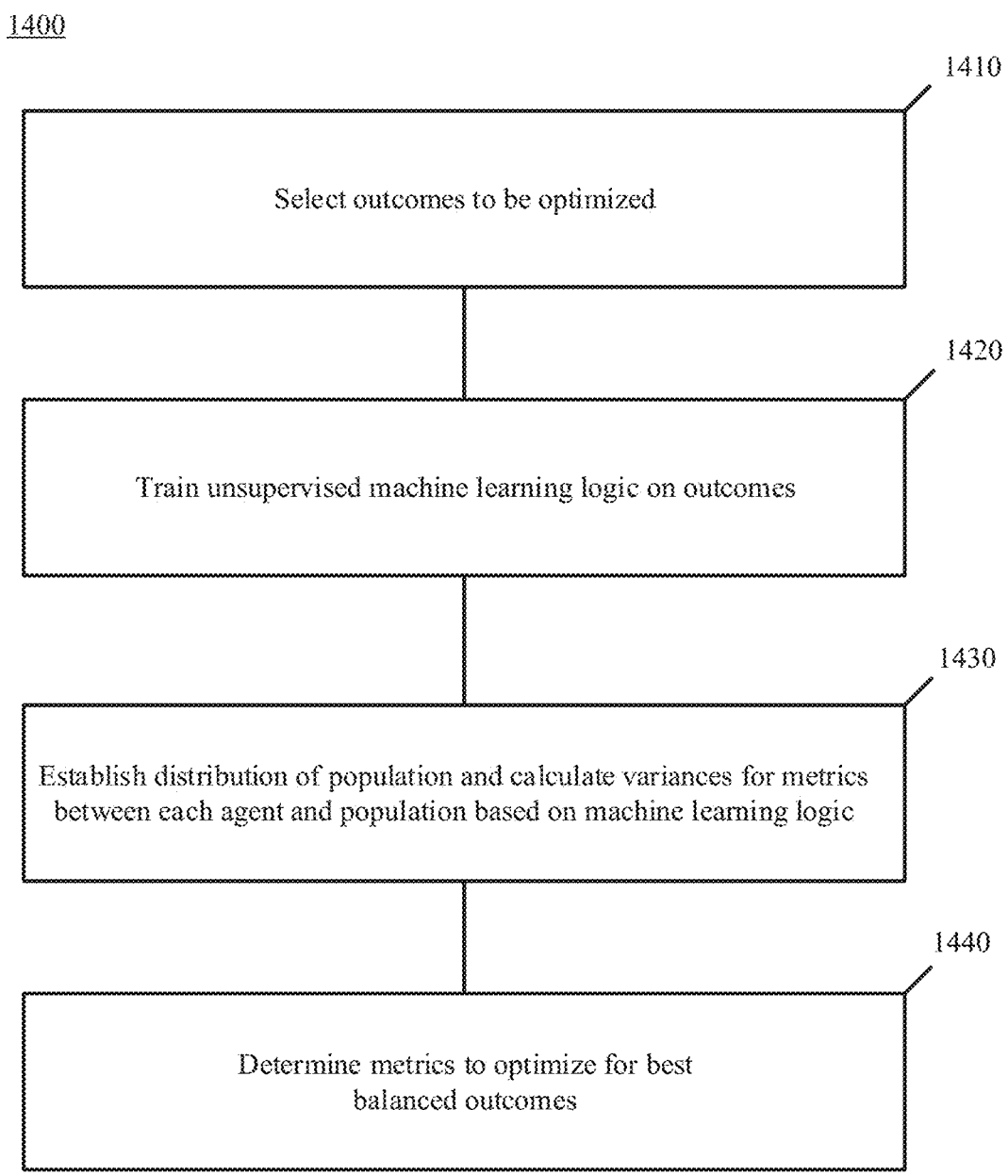
FIG. 14 is a flow diagram of a method for processing data through the computer system according to some embodiments.

FIG. 14 illustrates a process 1400 of metric optimizer 850 which may target action delivery that will yield largest improvements in one or more metrics. At 1410, the system (e.g. computing system 110) may provide a GUI for a user to select outcomes to be optimized (e.g. sales increase) or an outcome is selected by the system. At 1420, the system (e.g. recommendations component 160) may train an unsupervised machine learning logic routine to classify outcomes based on metrics. At 1430, the system may establish distribution of population and calculate variances for metrics between each agent and population based on machine learning logic. At 1440, the system may determine metrics or result effective variables to optimize for best balanced outcomes. One or more of the processes 1410-1440 of process 1400 may be computer instructions that when executed cause one or more processors to perform the functions of the respective process.

FIG. 15 illustrates a manager dashboard according to an implementation of the system, the manager dashboard being a GUI that may be provided on a manager terminal 530 by content delivery network 540. As illustrated, the manager may be automatically assigned tasks which are viewable in a task manager. The tasks (e.g. task 1, task 2, etc.) may be coaching or training sessions with various persons or agents (e.g. name 1, name 2, etc.). This manager may also view manager performance of managers under their supervision in the coaching comparison. Thus, while agents are ranked and monitored on certain metrics, the managers may also be monitored on effectiveness (e.g. effectiveness in delivering actions). These manager metrics may be manipulated, modeled, and processed like the agent metrics by the systems illustrated in FIGS. 1-7 above.

FIG. 16 illustrates a task manager specific view 1600 of a GUI provided by content delivery network 540 to an agent terminal 530 according to an implementation of the system. As illustrated, the agent may view their performance on multiple metrics and may view various tasks related to skill improvement (e.g. training). These tasks may be auto-generated by the action delivery component 170 and assigned to a manager (e.g. User #) for delivery, if necessary. This GUI 1600 may auto-play actions when the agent terminal determines the agent is available. Other notifications as described above may be displayed here. The leaderboard tab may compare the agent to their peers. The evaluate tab may allow evaluations of peers, managers, coaches, and themselves, for example. On an agent GUI the manager dashboard may be disabled.

Figure 17:
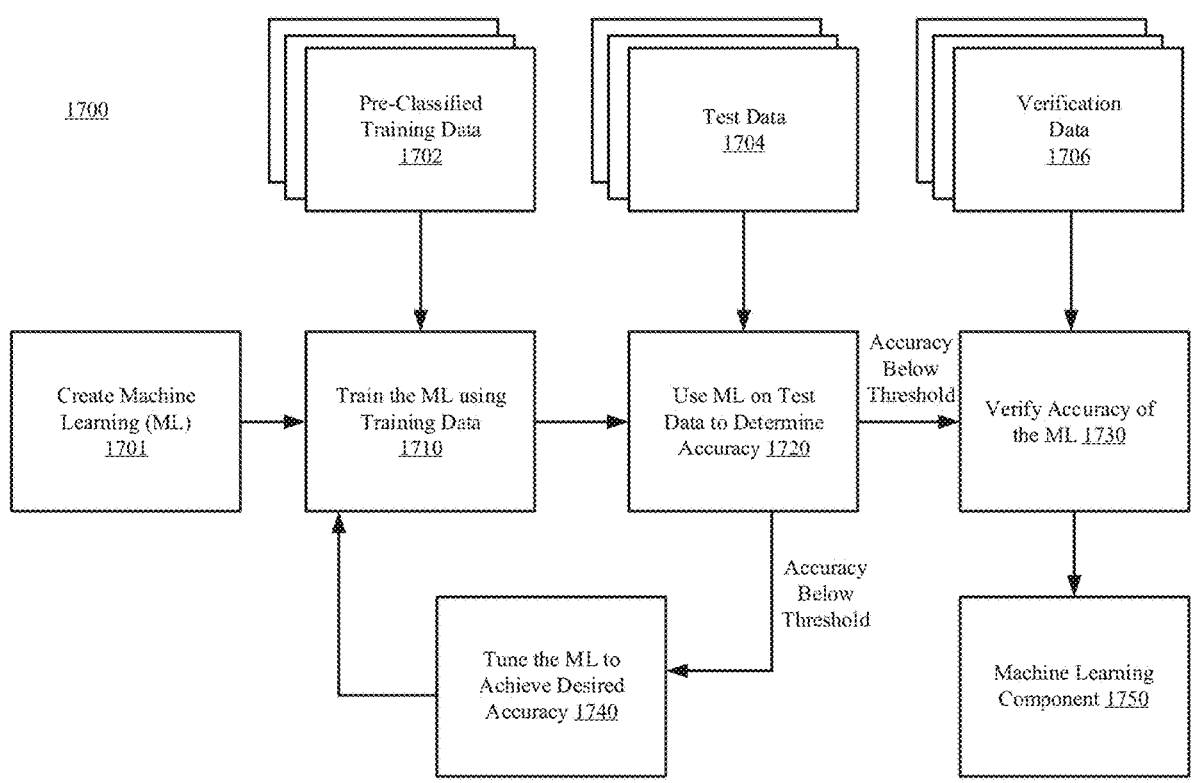
FIG. 17 is a block diagram of a system for training a machine learning model of the computer system according to some embodiments.

FIG. 17 is a flowchart of a process 1700 to train a machine learning algorithm, according to some implementations. The process 1700 may be performed by the one or more processing servers 130 of FIG. 1.

At 1701, the machine learning algorithm (e.g., software code) may be created by one or more software designers. At 1710, the machine learning algorithm may be trained using pre-classified training data 1702. For example, the training data 1702 may have been pre-classified by humans, by machine learning, or a combination of both. After the machine learning has been trained using the pre-classified training data 1702, the machine learning may be tested, at 1720, using test data 1704 to determine an accuracy of the machine learning. For example, in the case of a classifier (e.g., support vector machine), the accuracy of the classification may be determined using the test data 1704.

If an accuracy of the machine learning does not satisfy a desired accuracy threshold (e.g., 95%, 98%, 99% accurate), then at 1740, the machine learning code may be tuned, to achieve the desired accuracy. For example, at 1740, the software designers may modify the machine learning software code to improve the accuracy of the machine learning algorithm or prune the training data. After the machine learning has been tuned, at 1740, the machine learning may be retrained, at 1710, using the pre-classified training data 1702. In this way, 1710, 1720, and 1740 may be repeated until the machine learning is able to classify the test data 1704 with the desired accuracy.

After determining that an accuracy of the machine learning satisfies the desired accuracy threshold, the process may proceed to 1730 where verification data for 1706 may be used to verify an accuracy of the machine learning. After the accuracy of the machine learning is verified, at 1730, the machine learning component or logic 1750, which has been trained to provide a particular level of accuracy, may be used. The process 1700 may be used to train each of multiple machine learning algorithms. For example, as part of the recommendations component 160, a first machine learning may be used to make first predictions recommendation nnn, a second machine learning may be used to predict recommendations mmm, a third machine learning may be used to predict ppp, and so on.

Figure 18:
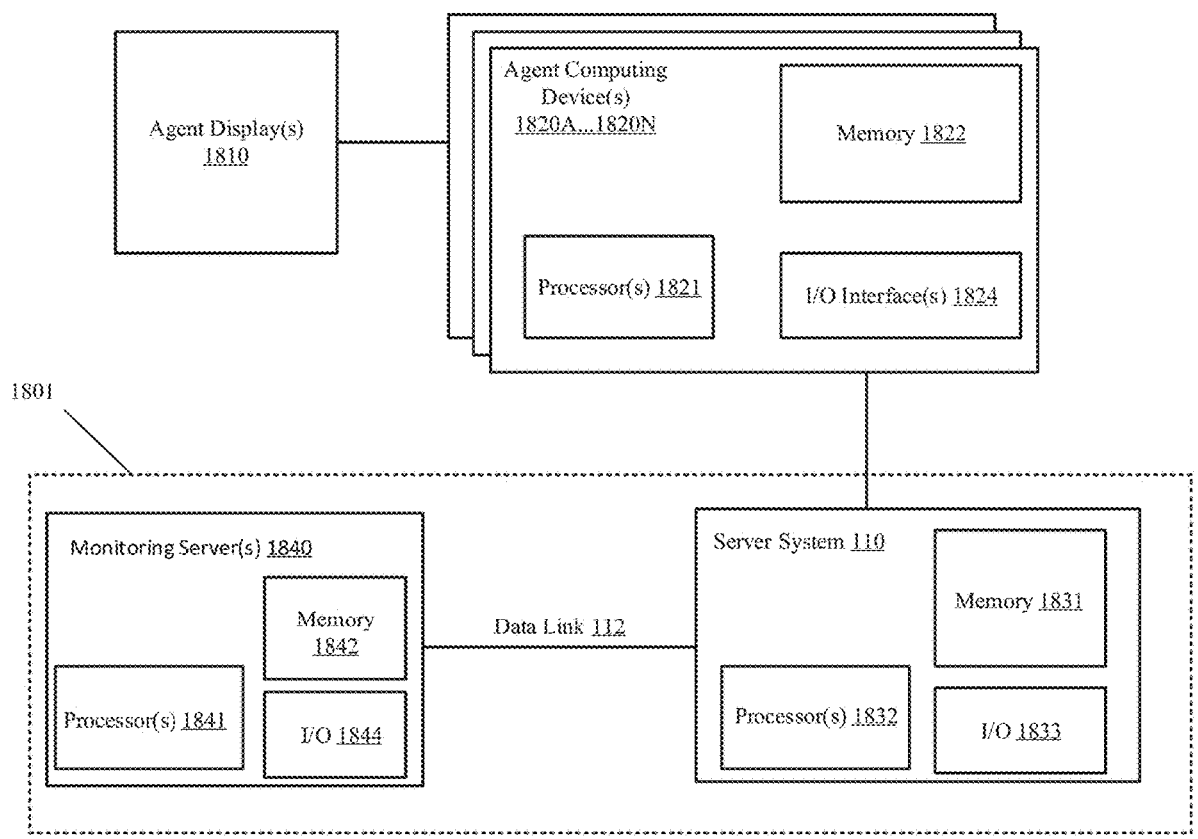
FIG. 18 is a block diagram of a system including various computing components of the computer system according to some embodiments.

FIG. 18 illustrates a reduced system connection diagram of the system illustrated in FIG. 5 such that one or more monitoring servers 1840 may be connected via data link 112 (or APIs 114) to server system or computing system 110, and server system 110 may be connected to one or more agent computing devices 1820A-N which may each be connected to an agent display 1810. The server system 110 may include one or more processors 1832, memory 1831, and I/O ports 1833. The monitoring servers 1840 may include one or more processors 1841, memory 1842, and I/O 1844. The agent computing devices 1820A-N, where N is any positive integer, may include one or more processors 1821, memory 1822, and I/O interfaces 1824. The connections may be internet connections, wireless, ethernet or other data connections.

The monitoring servers 1840 may operate one or more monitoring services (e.g. Salesforce) and may deliver monitored data to the server system 110 which may process the data for recommendations and actions as described in relation at least to FIGS. 1-7. The actions may be delivered to the agent computing device 1820A and may be displayed on the one or more agent displays 1810. The actions may be to improve the agent's performance in one or more metrics as described above. The display may show GUI 1500 if the agent is a manager or GUI 1600 if the agent is a front-line agent. Together the agent display 1810 and the agent computing devices 1820A-N may form the user terminals 530. The monitoring servers 1840 and the server system or computing system 110 may be located in the cloud as cloud resource 1801. The cloud resource 1801 may be a scalable and dynamically-assigned allocation of processor cores and storage media to the processes being executed on the monitoring servers 1840 and the server system or computing system 110. The cloud resource 1801 may provide the one or more processors 1841, memory 1842, I/O 1844, the one or more processors 1832, memory 1831, and I/O ports 1833.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "logic," "module," "mechanism," "cloud" or "component" as used herein generally represents software, hardware, or a combination of software and hardware that can be configured to implement prescribed functions. For instance, in the case of a software implementation, the term "module," "mechanism," "logic" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

The invention claimed is:

1. A server comprising:
one or more processors; and
one or more non-transitory computer-readable storage media to store instructions executable by the one or more processors to perform operations comprising:
receiving metrics data associated with a plurality of employees and gathered during a first time period, the metrics data received from a plurality of computing devices, wherein individual employees of the plurality of employees are associated with individual computing devices of the plurality of computing devices;
storing the metrics data in a database;
performing an analysis of at least a portion the metrics data;
generating, based on the analysis, one or more distributions of the plurality of employees based on key performance indicators in the metrics data;
generating, based on the one or more distributions, one or more persona models created by selecting metrics associated with an upper percentile of the one or more distributions of the plurality of employees;
determining to improve a performance of a set of employees with respect to at least one metric, based at least in part on comparing the metrics data associated with the set of employee with the one or more persona models;
training a set of machine learning models comprising two or more machine learning models, based on the one or more persona models to determine one or more result effective variables associated with the key performance indicators;
generating, by a voting classifier, a weighted result based on a top ranked subset of results from the two or more machine learning models;
determining, based on the at least one metric and the weighted result, an initial training to provide to each employee in the set of employees;
after providing each employee in the set of employees with the initial training, receiving, from the plurality of computing devices, additional metrics gathered in a second time period subsequent to the first time period;
retraining at least one machine learning model in the set of machine learning models based on the additional metrics data;
performing a comparison of the additional metrics data relative to the one or more persona models based at least in part on the retraining;
determining, by the set of machine learning models and based on the comparison, a recommendation to improve a performance of a particular at least one employee of the plurality of employees;
selecting, based on a personality type associated with the at least one employee and based on the recommendation, an additional training; and
automatically delivering the additional training to at least one computing device associated with the at least one employee.

2. The server of claim 1, wherein training the set of machine learning models based on the one or more persona models comprises determining one or more high performers based on the one or more persona models.

3. The server of claim 1, wherein the metrics data comprises data indicating individual employees interacting with an associated computing device of the plurality of computing devices in a particular time period.

4. The server of claim 1, wherein:
the two or more machine learning models comprise at least two of an extra trees classifier, a catboost classifier, an extreme gradient boost classifier, a light gradient boost machine, a gradient boosting classifier, quadratic discriminant analysis logic, linear discriminant analysis logic, a random forest classifier, logistic regression logic, naïve bayes, an ada boost classifier, a K-neighbors classifier, a decision tree classifier, a state vector machine (SVM) with a linear kernel, a ridge classifier, long short term memory logic, natural language processing logic, recurrent neural networks (RNN), convolutional neural networks (CNN), multi-level perceptrons, feedforward neural networks, or a combination thereof.

5. The server of claim 1, the operations further comprising:
determining, based on the at least one metric, a type of the initial training to provide to individual employees in the set of employees;
determining a personality type associated with a particular employee in the set of employees;
selecting, based on the personality type associated with the particular employee and based on the type of training, a particular training module; and
delivering the particular training module to the particular employee.

6. The server of claim 5, the operations further comprising:
determining, based on monitoring data from a particular computing device associated with the particular employee, a time period when the particular employee is available; and
delivering the particular training module to the particular employee during the time period when the particular employee is available.

7. The server of claim 5, the operations further comprising:
determining that the particular employee has completed the particular training module;
gathering second data associated with the particular employee in the second time period; and
determining that the particular employee has improved with respect to:
the at least one metric relative to a previously determined performance of the particular employee; or
the at least one metric relative to other peers in a peer group that includes the particular employee.

8. The server of claim 5, the operations further comprising:
determining that the particular employee has completed the particular training module;
gathering second data associated with the particular employee in a second time period that is subsequent to the particular employee completing the particular training module;
determining that the particular employee has not improved with respect to:

the at least one metric relative to a previously determined performance of the particular employee; and
the at least one metric relative to other peers in a peer group that includes the particular employee;
selecting, based on the personality type and on the type of training, a second particular training module; and
delivering the second particular training module to the particular employee.

9. The server of claim 5, wherein the set of employees is below a particular percentile in a standard distribution of employees.

10. A method, comprising:
receiving, by one or more processors, metrics data associated with a plurality of employees and gathered during a first time period, the metrics data received from a plurality of computing devices, wherein individual employees of the plurality of employees are associated with individual computing devices of the plurality of computing devices;
storing, by the one or more processors, the metrics data in a database;
performing an analysis of at least a portion of the metrics data;
generating, by the one or more processors and based on the analysis, one or more distributions of the plurality of employees based on key performance indicators in the metrics data;
generating, by the one or more processors and based on the one or more distributions, one or more persona models created by selecting metrics associated with an upper percentile of the one or more distributions of the plurality of employees;
determining to improve a performance of a set of employees with respect to at least one metric, based at least in part on comparing the metrics data gathered associated with the set of employee with the one or more persona models;
training, by the one or more processors, two or more machine learning models based on the one or more persona models to determine one or more result effective variables associated with the key performance indicators;
generating, by a voting classifier, a weighted result based on a top ranked subset of results from the at least two machine learning models;
determining, based on the at least one metric and the weighted result, an initial training to provide to each employee in the set of employees;
after providing each employee in the set of employees with the initial training, receiving, from the plurality of computing devices, by the one or more processors, additional metrics gathered in a second time period subsequent to the first time period;
retraining at least one machine learning model in the set of machine learning models based on the additional metrics data;
performing a comparison of the additional metrics data relative to the one or more persona models based at least in part on the retraining;
determining, by the one or more machine learning models and based on the comparison, a recommendation to improve a performance of at least one employee of the plurality of employees;
selecting, based on a personality type associated with the at least one employee and based on the recommendation, an additional training; and
automatically delivering, by the one or more processors, the additional training to at least one computing device associated with the at least one employee.

11. The method of claim 10, wherein training the two or more machine learning models comprises training of one or more classifiers that have been trained to identify and predict high performers based on the one or more persona models.

12. The method of claim 10, wherein:
the metrics data comprises data associated with individual employees interacting with an associated computing device of the plurality of computing devices received in the first time period; and
the additional training results in the at least one employee moving from a below-average portion of the one or more distributions to an above-average portion of the one or more distributions.

13. The method of claim 12, further comprising:
determining a measured outcome based on the additional metrics data;
performing a comparison of the expected outcome to the measured outcome;
determining an additional recommendation based on the comparison; and
automatically delivering the additional recommendation to the particular computing device associated with the particular employee.

14. The method of claim 12, wherein: the two or more machine learning models comprise at least two of an extra trees classifier, a catboost classifier, an extreme gradient boost classifier, a light gradient boost machine, a gradient boosting classifier, quadratic discriminant analysis logic, linear discriminant analysis logic, a random forest classifier, logistic regression logic, naïve bayes, an ada boost classifier, a K-neighbors classifier, a decision tree classifier, a state vector machine (SVM) with a linear kernel, a ridge classifier, long short term memory logic, natural language processing logic, recurrent neural networks (RNN), convolutional neural networks (CNN), multi-level perceptrons, feedforward neural networks, or a combination thereof.

15. The method of claim 10, further comprising:
determining, based on the at least one metric, a type of the initial training to provide individual employees in the set of employees based on a variance of individual employees relative to a high performer persona of the one or more personal models;
determining a personality type associated with a particular employee in the set of employees;
selecting, based on the personality type and based on the type of training, a particular training module; and
delivering the particular training module to the particular employee.

16. The method of claim 15, further comprising:
determining that the particular employee has completed the particular training module;
gathering second data associated with the particular employee in the second time period that is subsequent to the particular employee completing the particular training module; and
determining that the particular employee has improved with respect to:
the at least one metric relative to a previously determined performance of the particular employee; and
the at least one metric relative to other peers in a peer group that includes the particular employee.

17. One or more non-transitory computer-readable media storing instructions executable by one or more processors to perform operations comprising:

receiving metrics data associated with a plurality of employees and gathered during a first time period, the metrics data received from a plurality of computing devices, wherein individual employees of the plurality of employees are associated with individual computing devices of the plurality of computing devices;

storing the metrics data in a database, the database comprising non-transitory computer readable media storing the metrics data in computer readable form;

performing an analysis of at least a portion of the metrics data;

generating, based on the analysis, one or more distributions of the plurality of employees based on key performance indicators in the metrics data;

generating, based on the one or more distributions, one or more persona models created by selecting metrics associated with an upper percentile of the one or more distributions of the plurality of employees;

determining to improve a performance of a set of employees with respect to at least one metric, based at least in part on comparing the metrics data associated with the set of employee with the one or more persona models;

training two or more machine learning models based on the one or more persona models to determine one or more result effective variables associated with the key performance indicators;

generating, by a voting classifier, a weighted result based on a top ranked subset of results from the two or more machine learning models;

determining, based on the at least one metric and the weighted result an initial training to provide to each employee in the set of employees;

after providing each employee in the set of employees with the initial training, receiving, from the plurality of computing devices, additional metrics gathered in a second time period subsequent to the first time period;

retraining at least one machine learning model in the set of machine learning models based on the additional metrics data;

performing a comparison of the additional metrics data relative to the one or more persona models based at least in part on the retraining;

determining, by the one or more machine learning models and based on the comparison, a recommendation to improve a performance at least one employee of the plurality of employees;

selecting, based on a personality type associated with the at least one employee and based on the recommendation, an additional training; and automatically delivering the additional training to at least one computing device associated with the at least one employee.

18. The one or more non-transitory computer-readable media of claim 17, wherein:
the metrics data comprises data associated with individual employees interacting with an associated computing device of the plurality of computing devices received in the first time period; and
the recommendation has an expected outcome comprising moving the particular employee that is in a below-average portion of the one or more distributions to an above-average portion of the one or more distributions.

19. The one or more non-transitory computer-readable media of claim 18, further comprising:
determining a measured outcome based on the additional metrics data;
performing a comparison of the expected outcome to the measured outcome;
determining an additional recommendation based on the comparison; and
automatically delivering the additional recommendation to the particular computing device associated with the particular employee.

20. The one or more non-transitory computer-readable media of claim 17, further comprising:
determining, based on the at least one metric, a type of the initial training to provide to individual employees in the set of employees;
determining a personality type associated with a particular employee in the set of employees;
selecting, based on the personality type associated with the particular employee and based on the type of training, a particular training module; and
delivering the particular training module to the particular employee.

* * * * *